United States Patent
Bartlett et al.

(10) Patent No.: US 6,655,455 B2
(45) Date of Patent: Dec. 2, 2003

(54) FLOW COMPLETION SYSTEM

(75) Inventors: Christopher D. Bartlett, Spring, TX (US); Christopher E. Cunningham, Spring, TX (US); Richard D. Kent, Newburgh (GB); Nicholas Gatherar, Juniper Green (GB); David Harrold, Houston, TX (US)

(73) Assignee: FMC Technologies, Inc., Chicago, IL (US)

(*) Notice: Subject to any disclaimer, the term of this patent is extended or adjusted under 35 U.S.C. 154(b) by 0 days.

(21) Appl. No.: 10/213,749

(22) Filed: Aug. 5, 2002

(65) Prior Publication Data

US 2002/0189813 A1 Dec. 19, 2002

Related U.S. Application Data

(63) Continuation of application No. 09/815,437, filed on Mar. 22, 2001, now Pat. No. 6,494,257.
(60) Provisional application No. 60/192,124, filed on Mar. 24, 2000, and provisional application No. 60/268,329, filed on Feb. 12, 2001.

(51) Int. Cl.[7] .............................................. E21B 27/12
(52) U.S. Cl. ...................... 166/86.2; 166/368; 166/348; 166/95.1
(58) Field of Search ............................. 166/95.1, 97.1, 166/86.3, 86.2, 75.14, 368, 348

(56) References Cited

U.S. PATENT DOCUMENTS

| | | | | |
|---|---|---|---|---|
| 3,448,803 A | * | 6/1969 | Sizer ........................... | 166/115 |
| 3,494,420 A | * | 2/1970 | Sizer ........................... | 166/250.01 |
| 4,405,016 A | * | 9/1983 | Best ............................ | 166/337 |
| 5,544,707 A | * | 8/1996 | Hopper et al. .............. | 166/382 |
| 5,868,204 A | * | 2/1999 | Pritchett et al. ............ | 166/368 |
| 6,050,339 A | * | 4/2000 | Milberger ................... | 166/368 |
| 6,367,551 B1 | * | 4/2002 | Fenton ........................ | 166/345 |
| 2002/0011336 A1 | | 1/2002 | Baskett et al. | |

OTHER PUBLICATIONS

Amoco Production Company Conceptual Design Study—Subsea Well Completions with Electrical Submersible Pumps (FMC Petroleum Equipment Group, Jan. 12, 1990).

* cited by examiner

Primary Examiner—Robert E. Pezzuto
Assistant Examiner—Thomas A. Beach
(74) Attorney, Agent, or Firm—Henry C. Query, Jr.

(57) ABSTRACT

A flow completion system for controlling the flow of fluid from a well bore, the flow completion system comprising a tubing spool, a tubing hanger supporting a tubing string which extends into the well bore and defines a tubing annulus surrounding the tubing string; a first closure member which is positioned in the production bore above the production passageway; a first annular seal wherein the first closure member and the first seal comprise a first pressure-containing barrier between the well bore and a surrounding environment; a second closure member which is positioned in the production bore above the first closure member; and a second annular seal wherein the second closure member and the second seal comprise a second pressure-containing barrier between the well bore and the environment; and wherein both the first and the second barriers are associated with the tubing hanger.

24 Claims, 18 Drawing Sheets

FLOW COMPLETION SYSTEM

This application is a continuation of U.S. patent application Ser No. 09/815,437, filed Mar. 22, 2001 now U.S. Pat. No. 6,494,257, which is based on U.S. Provisional Patent Application No. 60/192,124, which was filed on Mar. 24, 2000, and U.S. Provisional Patent Application No. 60/268,329, which was filed on Feb. 12, 2001.

BACKGROUND OF THE INVENTION

The present invention relates to a flow completion system for producing oil or gas from a subsea well. More particularly, the invention relates to such a system which comprises a tubing hanger which is supported in a tubing spool and includes two distinct pressure-containing barriers between the well bore and the environment, an axial annulus bore and a remotely-operable closure member for controlling flow through the annulus bore.

A typical horizontal-type flow completion system, such as that disclosed in U.S. Pat. No. 6,039,119, comprises a wellhead housing which is installed at the upper end of a well bore, a tubing spool which is connected to the top of the wellhead housing and which includes a central bore that extends axially therethrough, an annular tubing hanger which is suspended in the central bore, and a tree cap which is installed in the central bore above the tubing hanger. The tubing hanger supports at least one tubing string that extends into the well bore and defines a tubing annulus surrounding the tubing string. In addition, the tubing hanger comprises a concentric production bore which communicates with the tubing string and a lateral production passageway that extends between the production bore and a production outlet in the tubing spool. The tubing spool also includes an annulus passageway which extends from the tubing annulus to an annulus outlet, and a workover passageway which extends from the annulus passageway to a portion of the central bore that is located above the tubing hanger. The annulus and workover passageways provide for communication between the tubing annulus and the portion of the central bore located above the tubing hanger during installation and workover of the flow completion system.

The regulations of certain countries pertaining to the subsea production of oil and gas require that the flow completion system provide at least two pressure-containing barriers between the well bore and the environment at all times. In the production mode of operation of the typical horizontal flow completion system, the first barrier is provided by a wireline plug that is installed in the production bore above the production passageway, in conjunction with an annular, usually metal seal which is positioned between the tubing hanger and the tubing spool above the production outlet. The second barrier is provided by the tree cap, which is sealed to the tubing spool by an annular, typically metal seal and which often includes an axial through bore which in turn is sealed by a wireline plug or other suitable closure member.

During installation of the flow completion system, the tubing spool is landed onto the wellhead housing, after which a blowout preventer ("BOP") is installed onto the tubing spool by means of a riser deployed from a surface vessel. The tubing hanger is then lowered on a tubing hanger running tool ("THRT") through the riser and the BOP and landed in the central bore of the tubing spool. After the THRT is retrieved, the tree cap is lowered on a dedicated tool through the riser and the BOP and landed in the central bore directly above the tubing hanger. After the tree cap is installed, the THRT is retrieved, the BOP is retrieved, and the flow completion system is ready to be put into production. During a typical workover of the flow completion system, the BOP and the riser are once again connected to the tubing spool, the tree cap is usually removed from the tubing spool, and the THRT is connected to the tubing hanger. Once the workover operations are completed, the THRT is retrieved and the tree cap is re-installed through the riser and the BOP. Then the THRT is retrieved, the BOP is retrieved, and the flow completion system is ready to be put back into production.

Since the tree cap is required to maintain well pressure in the event of a failure of the first barrier, the tree cap typically comprises a rigid metal body and a robust metal lockdown mechanism to firmly lock the body to the tubing spool. Consequently, the tree cap is usually too heavy to be installed by a remotely operated vehicle ("ROV") and must instead be lowered from the surface vessel on a specially designed tree cap running tool. Thus, installation of the tree cap requires a special running trip, both during installation of the flow completion system and after a workover operation. Each such trip typically requires a significant amount of valuable rig time to complete, which necessarily increases the cost of completing and maintaining the well.

In addition, during retrieval of the THRT prior to installing the tree cap, debris within the riser often falls into the central bore of the tubing spool above the tubing hanger. Left unattended, this debris could foul the sealing surfaces of the central bore and thereby prevent the tree cap from forming an effective seal with the tubing spool. Therefore, before the tree cap is installed the central bore must be thoroughly cleaned, a process that consumes additional valuable rig time and increases the cost of completing and maintaining the well.

SUMMARY OF THE INVENTION

In accordance with the present invention, these and other disadvantages in the prior art are overcome by providing a flow completion system for controlling the flow of fluid from a subsea well bore, the flow completion system comprising a tubing spool which includes a central bore that extends axially therethrough and a production outlet which communicates with the central bore, a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string, a first closure member which is positioned in the production bore above the production passageway, and a first annular seal which is positioned between the tubing hanger and the central bore above the production passageway. Thus, the first closure member and the first seal comprise a first pressure-containing barrier between the well bore and a surrounding environment. Moreover, the flow completion system also includes a second closure member which is positioned in the production bore above the first closure member, and a second annular seal which is positioned between the tubing hanger and the central bore above the first seal. Thus, the second closure member and the second seal comprise a second pressure-containing barrier between the well bore and the environment. In this manner, both the first and the second barriers are supported on the tubing hanger. Thus, no need exists for a separate pressure-containing tree cap to provide a second barrier to the well bore.

In accordance with another aspect of the present invention, the flow completion system also comprises an annulus bore which extends generally axially through the tubing hanger between the tubing annulus and a portion of the central bore that is located above the second seal, and an annulus closure member which is positioned in the annulus bore. Thus, the annulus bore is routed entirely within the tubing hanger, and flow through the annulus bore is controlled by a closure member which is also located in the tubing hanger. Therefore, no need exists to route the annulus bore through the tubing spool or to locate the annulus closure member on the tubing spool.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
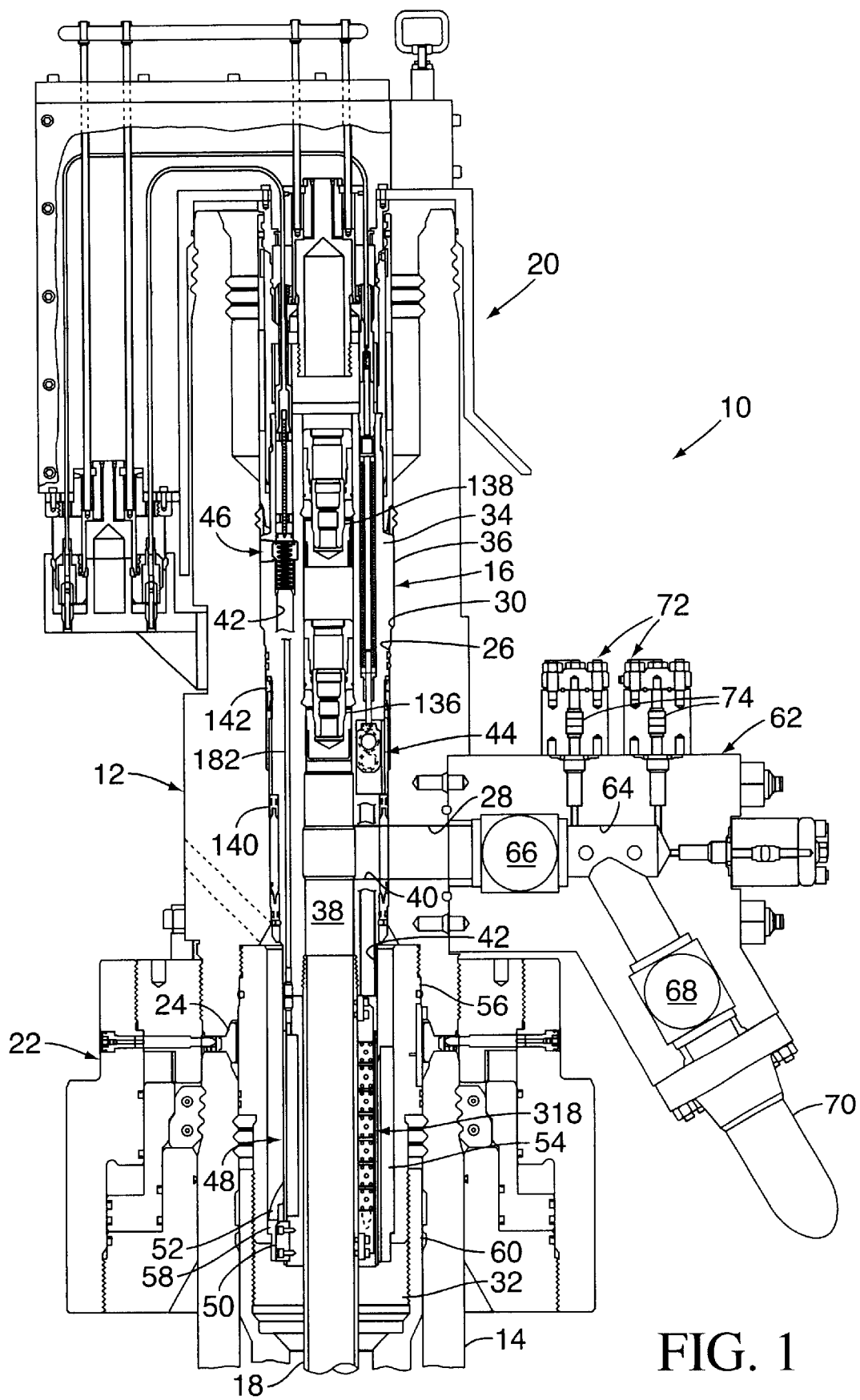
FIG. 1 is a longitudinal cross-sectional view of an embodiment of the flow completion system of the present invention.

Referring to FIG. 1, the flow completion assembly of the present invention, which is indicated generally by reference number 10, is shown to comprise a tubing spool 12 which is connected to the top of a wellhead housing 14 that is installed at the upper end of a well bore (not shown), a tubing hanger 16 which is supported in the tubing spool 12 and from which is suspended at least one tubing string 18 that extends into the well bore, and an optional controls bridge 20 that is mounted to the top of the tubing spool 12.

The tubing spool 12 is secured to the wellhead housing 14 by a suitable connector assembly 22 and is sealed to the top of the wellhead housing 14 with an appropriate annular seal 24. The tubing spool comprises a generally cylindrical central bore 26 which extends axially therethrough, a lateral production outlet 28 which communicates with the central bore, and an annular support shoulder 30 which is located in the central bore. The support shoulder 30 may be either a separate support ring which is remotely installable in a corresponding receptacle in the central bore 26, or an integral part of the tubing spool 12 which is formed by a reduced diameter portion of the central bore, as shown in FIG. 1. As used herein, the term "tubing spool" should be understood to include a spool tree, a Christmas tree or any other spool member in which the tubing hanger may be supported.

The tubing hanger 16 is supported on the annular shoulder 30 and is attached to the upper end of the tubing string 18 by conventional means, such as threads. The tubing string 18 extends into the well bore and defines a production bore within the tubing string and a tubing annulus 32 surrounding the tubing string. While the invention is described herein with reference to a single tubing string 18, it should be understood that tubing hanger 16 could be adapted to support two or more tubing strings, which may be either production or injection tubing strings, in a manner well known in the art.

The tubing hanger 16 is shown to include an annular main body 34 which comprises a generally stepped cylindrical outer wall 36, a production bore 38 which extends axially and concentrically through the body 34 and communicates with the production bore of the tubing string 18, a lateral production passageway 40 which extends between the production bore 38 and the outer wall 36, and an annulus bore 42 which extends generally axially from the tubing annulus 32 to a portion of the central bore 26 that is located above the tubing hanger 16. The tubing hanger 16 also includes a first closure member 44 and, in the embodiment of the invention depicted in FIG. 1, preferably also a second closure member 46 for controlling flow through the annulus bore 42. The preferred embodiments of these closure members will be described in more detail below.

The tubing hanger 16 preferably also comprises a lower extension member or alignment sub 48 which includes an axial bore that is coaxial with the production bore 38 and is sufficiently large to allow the tubing string 18 to pass therethrough and connect directly to the body 34 of the tubing hanger. The extension member 48 is precisely oriented with respect to the tubing hanger via one or more alignment pins (not shown), and is secured thereto by any suitable means, such as a plurality of bolts (not shown). In addition, the extension member 48 preferably includes a radially extending lug or key 50 which, as the tubing hanger 16 is landed in the tubing spool 12, engages a helical upper surface 52 of an orienting sleeve 54 to cause the tubing hanger 16 to rotate into a desired orientation. The orienting sleeve 54 is supported in an adapter bushing 56 which is connected to the lower portion of the tubing spool 12 by threads or other conventional means. In addition, suitable seals may be positioned around the adapter bushing 56 and between both the tubing spool 12 and the wellhead housing 14 to provide a backup to the seal 24. Once the tubing hanger 16 reaches the proper orientation with respect to the tubing spool 12, the key 50 will drop into a slot 58 which is formed in the orienting sleeve 54 at the bottom of the helical surface 52 to trap the tubing hanger into its proper orientation.

The flow completion assembly 10 may also include a lockdown sleeve 60 which is threaded onto the bottom of the adapter bushing 56. After the tubing spool 12 is landed and locked on the wellhead housing 14, the lockdown sleeve 60 may be unscrewed using an appropriate tool until a bottom surface of the lockdown sleeve engages the top of a production casing hanger (not shown) which is suspended in the wellhead housing 14. The lockdown sleeve 60 will thus prevent the casing hanger from moving due to, for example, thermal expansion or contraction of the production casing. Suitable seals may also be provided between the lockdown sleeve 60 and both the adapter bushing 56 and the casing hanger so that the tubing spool 12 will, in effect, seal to the casing hanger in addition to or instead of the wellhead housing 14.

Referring still to FIG. 1, the flow completion assembly 10 also includes at least one closure member for controlling flow through the production outlet 28. In the embodiment of the invention depicted in FIG. 1, the production outlet closure member is housed in a valve block 62 which is bolted to the tubing spool 12. However, as is well understood in the art, the closure member may be incorporated within the body 34 of the tubing spool 12 or comprise a separate, distinct component which is bolted or otherwise secured to the tubing spool 12. The valve block 62 is shown to comprise an internal flow passageway 64 which communicates with the production outlet 28, a production master valve 66, a production wing valve 68, and a flow loop 70 for connecting the flow passageway 64 to an external flowline (not shown). The flow completion assembly 10 may also comprise a number of service valve blocks 72, each of which typically includes a remotely actuated valve 74 for selectively connecting an external service and control line (not shown) to the flow passageway 62.

Figure 2:
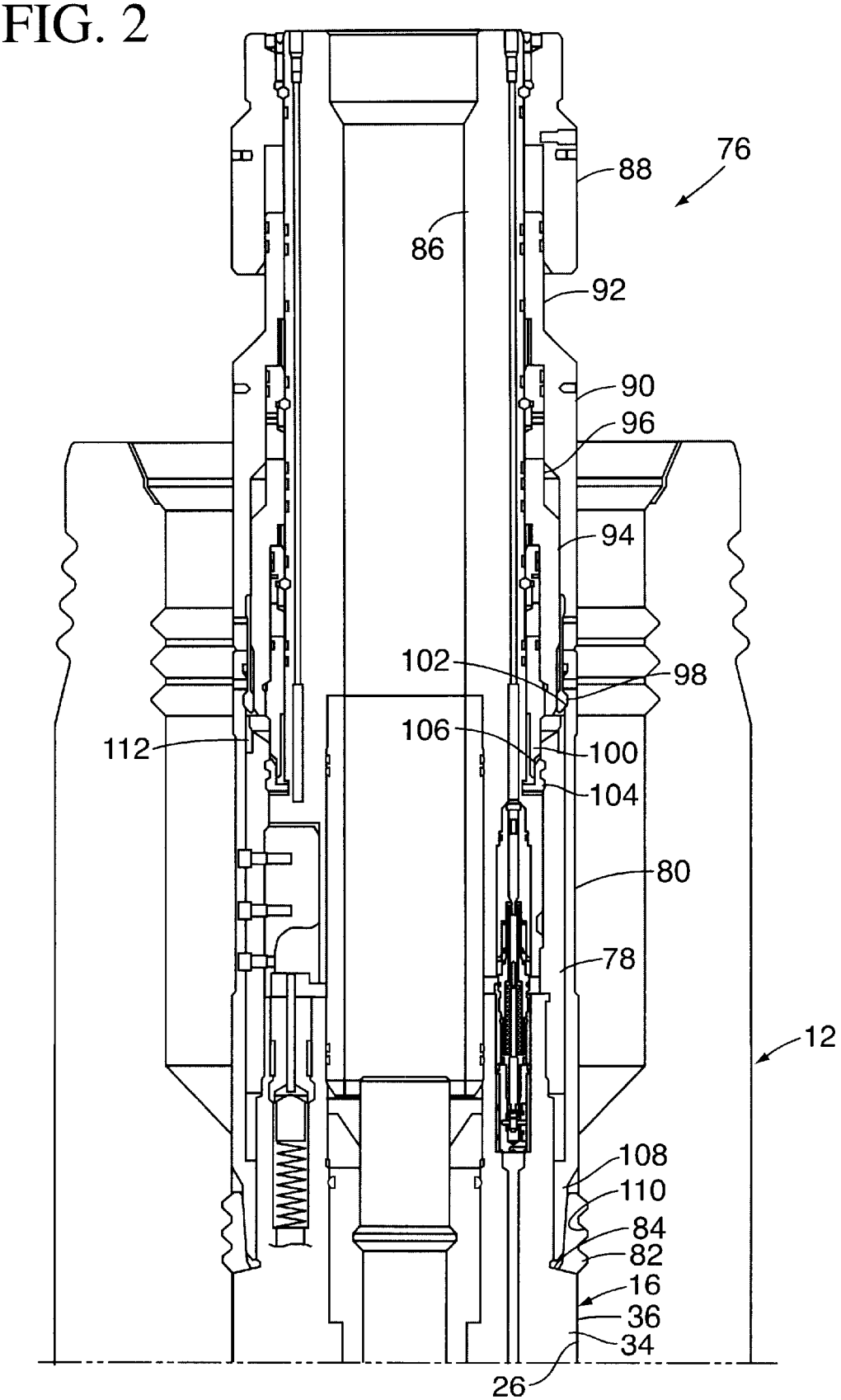
FIG. 2 is an enlarged view of the top portion of the flow completion system shown in FIG. 1, but with the controls bridge component removed and with a running tool connected to the top of the tubing hanger component of the invention.

As shown in FIG. 2, the tubing hanger 16 is run into the tubing spool 12 on a running tool 76, only a portion of which is shown. The running tool 76 is a relatively standard component and forms no part of the present invention; however, a description thereof is included herein to facilitate an understanding of the present invention. To simplify connecting the tubing hanger 16 to the running tool 76 and locking the tubing hanger to the tubing spool 12, the tubing hanger is ideally provided with a cylindrical upper extension 78 which is threaded or secured by other suitable means to the top of body 34, a locking mandrel 80 which is slidably received over the upper extension 78, and an expandable locking ring 82 which is supported on a shoulder 84 that is formed by a reduction in the diameter of the outer wall 36. The running tool 76 includes a tubular body 86 which is connected to a running string (not shown), an annular retention sleeve 88 which is secured to the upper end of the body 86, a cylindrical first locking piston 90 which includes a first sleeve portion 92 that is slidably received over the body 86 below the retention sleeve 88, and a cylindrical second locking piston 94 which includes a second sleeve portion 96 that is slidably received over the body 86 below the first sleeve portion 92. A collet finger ring having a plurality of depending collet fingers 98 is attached to the lower end of the first locking piston 90, and a wedge ring 100 is attached to the lower end of the second locking piston 94.

In operation, the running tool 76 is lowered onto the tubing hanger 16 until the bottom of the first locking piston 90 engages the top of the locking mandrel 80 and the collet fingers 98 enter into a corresponding groove 102 that is formed on the inner diameter of the locking mandrel. The second locking piston 94 is then stroked downward to trap the collet fingers 98 in the groove 102 and thereby lock the first locking piston 90 to the locking mandrel 80. Simultaneously, the wedge ring 100 will force an expandable locking ring 104 into a corresponding groove 106 that is formed on the inner diameter of the upper extension 78 to thereby lock the running tool 76 to the tubing hanger 16. Once the tubing hanger is landed in the tubing spool 12, the first locking piston 90 is stroked downward to push the locking mandrel 80 downward and force a lower nose ring 108 on the locking mandrel behind the lock ring 82. This will push the lock ring 82 radially outwardly into a locking profile 110 which is formed in the central bore 26 to thereby lock the tubing hanger to the tubing spool 12. The inner diameter surface of the nose ring 108 preferably comprises a plurality of serrations which will frictionally engage the outer wall 36 of the tubing hanger to aid in maintaining the locking mandrel 80 in the downward or locked position.

After the tubing hanger 16 is locked in the tubing spool, the second locking piston 94 is stroked upward to unlock the running tool 76 from the tubing hanger 16. This will also unlock the collet fingers 98 from the locking mandrel 80 and therefore allow the running tool to be retrieved while the locking mandrel remains in the locked position. The tubing hanger 16 can also be retrieved using the running tool 76 by connecting the running tool to the tubing hanger as described above and then stroking the first locking piston 90 upward to pull the locking mandrel 80 upward and thereby allow the lock ring 82 to retract out of the locking profile 110.

The tubing hanger 16 preferably includes an anti-backoff mechanism to maintain the locking mandrel 80 in the locked position and thereby ensure that the tubing hanger remains securely locked to the tubing spool 12 during operation of the flow completion assembly 10. In the embodiment of the invention shown in FIG. 2, the anti-backoff mechanism comprises an anti-backoff ring 112 which is secured such as by threads to the upper extension 78 and includes a serrated outer surface that engages a corresponding grooved surface which is formed on the inner diameter of the locking mandrel 80. This interface between the anti-backoff ring and the locking mandrel will thus maintain the locking mandrel in the locked position relative to the upper extension 78.

Figure 3:
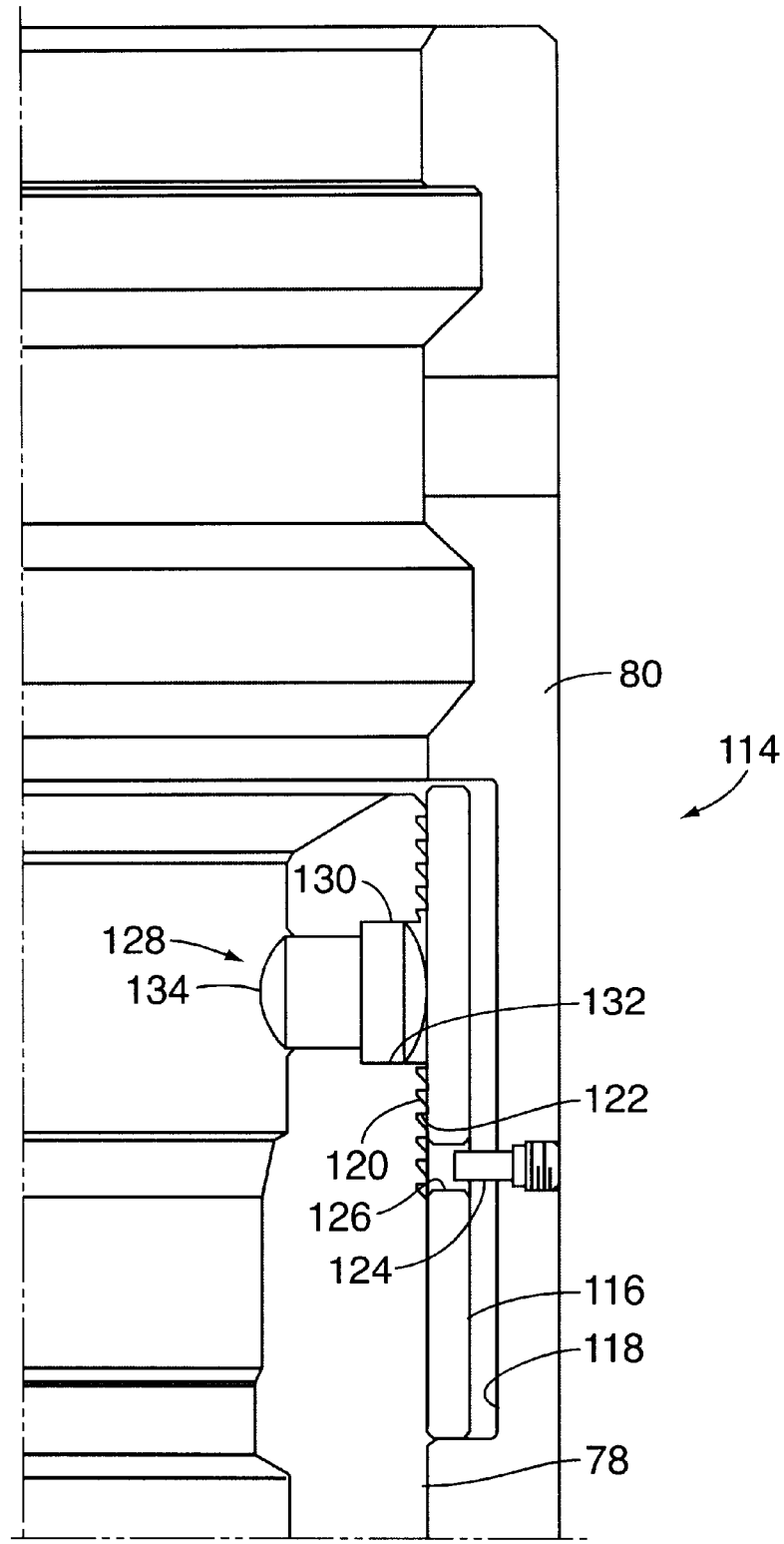
FIG. 3 is an enlarged sectional view of a tubing hanger anti-backoff mechanism which may be used in the present invention.

An alternative anti-backoff mechanism is illustrated in FIG. 3. In this embodiment, the anti-backoff mechanism, which is indicated generally by reference number 114, is shown to comprise a split ring 116 which is supported in an annular recess 118 that is formed on the inner diameter of the locking mandrel 80. The split ring 116 includes an integral upwardly directed tooth ring 120 which in the locking position of the anti-backoff mechanism 114 resides in one of a plurality of downwardly directed annular grooves 122 that are formed in the outer diameter of the upper extension 78 of the tubing hanger 16. In this position, upward forces on the locking mandrel 80 are transmitted via the recess 118 through the split ring 116 and the tooth ring 120 to the upper extension 78. Consequently, the locking mandrel will be prevented from moving upward and out of its locking position with respect to the tubing hanger 16. However downward forces on the locking mandrel 80 will cause the tooth ring 120 to cam out of its groove 122 and engage in a lower groove 122. The anti-backoff mechanism 114 may also comprise a plurality of guide pins 124 which extend laterally into corresponding holes 126 that are formed in the split ring 116 to help maintain the split ring properly oriented within the recess 118.

Furthermore, although the split ring 116 is normally biased against the upper extension 78, the anti-backoff mechanism 114 preferably includes a plurality of release pins 128 to urge the tooth ring 120 away from the grooves 122 so that the locking mandrel 80 can be retracted during retrieval of the tubing hanger 16. Each release pin 128 comprises cylindrical body portion having an enlarged diameter head 130 which is trapped in a corresponding stepped-diameter hole 132 that is formed in the upper extension 78. Prior to retrieval of the tubing hanger 16, the running tool 76 is landed on the tubing hanger and the second locking piston 94 is stroked downward to bring an outer diameter portion of the second locking piston against a rear camming face 134 of each release pin 128. This forces the release pins 128 radially outwardly into split ring 116 and pushes split ring away from the upper extension 78 to thereby move the tooth ring 120 out of engagement with the grooves 122.

Referring again to FIG. 1, in the production mode of operation of the flow completion system 10, the production bore 38 is sealed above the production passageway 40 by a first closure member 136 and, in accordance with the present invention, preferably also a second closure member 138. The closure members 136,138 are preferably wireline crown plugs which are received in corresponding profiles that are formed in the production bore 38 or in a bore insert (not shown) that is secured and sealed within production bore. In addition, a test port (not shown) is ideally routed between the plugs in a conventional fashion to prevent the creation of a hydraulic lock during installation of the second plug 138 and to facilitate the testing of both plugs after they are installed. Furthermore, the tubing hanger 16 is sealed to the central bore 26 of the tubing spool 12 by a first annular seal 140 which is positioned between the tubing hanger and the tubing spool above the production passageway 40 and, in accordance with the present invention, preferably also a second annular seal 142 which is positioned between the tubing hanger and the tubing spool above the first seal 140.

Figure 4:
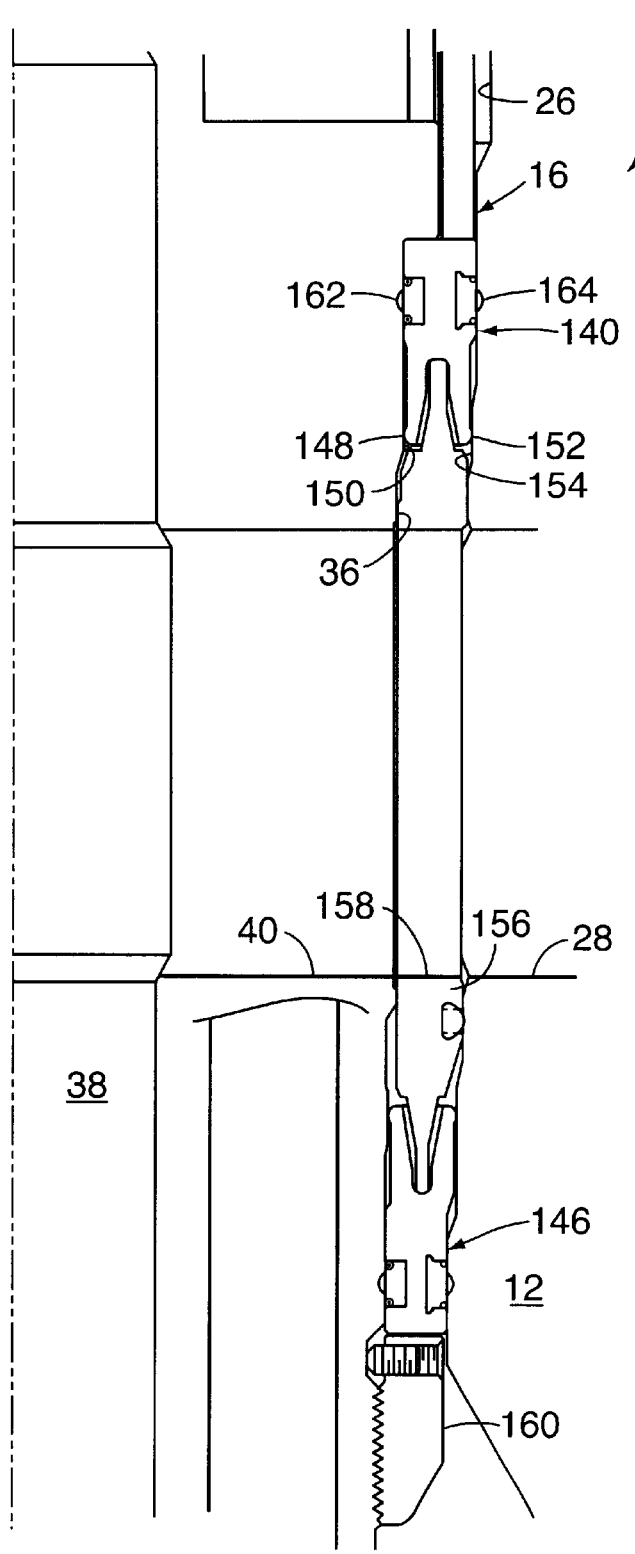
FIG. 4 is an enlarged sectional view of the production seal assembly component of the flow completion system shown in FIG. 1.

Referring to FIG. 4, the first seal 140 ideally forms part of a production seal assembly 144 that also includes an annular lower seal 146 which is positioned between the tubing hanger 16 and the tubing spool 12 below the production passageway 40. Each seal 140,146 is preferably a straight bore-type metal seal which comprises an inner radial sealing lip 148 that engages a corresponding annular sealing surface 150 which is formed on the outer wall 36 of the tubing hanger and an outer radial sealing lip 152 that engages a corresponding annular sealing surface 154 which is formed on the central bore 26. In addition, the seals 140,146 are optimally oriented so that the sealing lips will be energized into engagement with their corresponding sealing surfaces by the pressure within the production passageway 40. The seals 140, 146 are spaced apart on the tubing hanger 16 by a spacer ring 156 which includes a lateral hole 158 that aligns with the production passageway 40, and the entire seal assembly 144 is secured to the tubing hanger by a retainer ring 160. Furthermore, in the embodiment of the invention shown in FIG. 4, each seal 140,146 includes a pair of backup seal rings 162,164 which are mounted in corresponding grooves that are formed on the seals 140, 146. While, the backup seal rings 162,164 may be any suitable seals, they are preferably non-metallic face-type seals.

Figure 5:
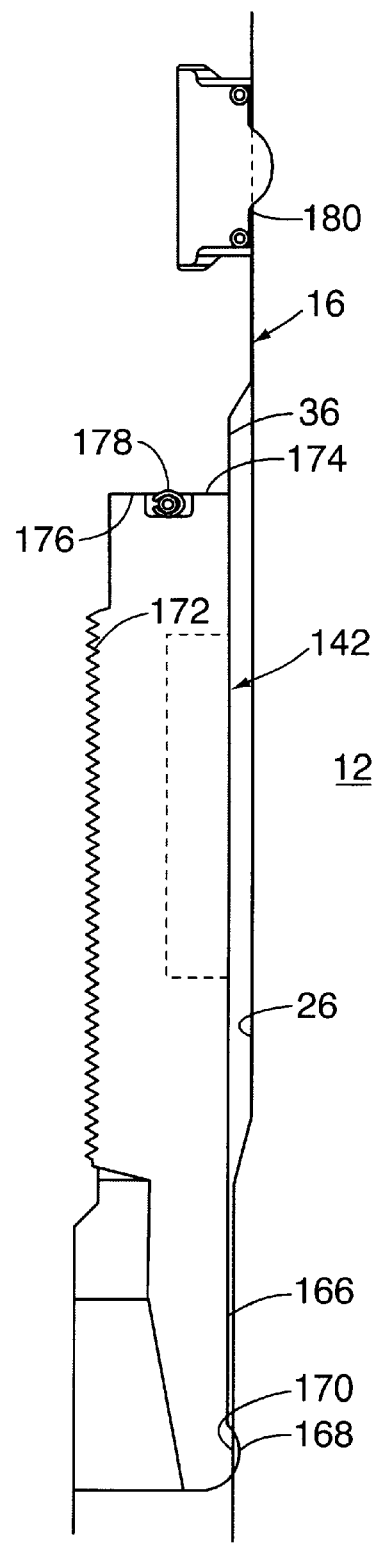
FIG. 5 is an enlarged sectional view of the secondary annular seal component of the flow completion system shown in FIG. 1.

The second seal 142 is preferably similar in design an operation to the first seal 140 and is connected to the outer wall 36 using a suitable T-support ring. Alternatively, as shown in FIG. 5 the second seal 142 may comprise a depending radial leg 166 on which is formed an annular sealing lip 168 that engages a corresponding sealing surface 170 which is formed in the central bore 26. The seal 142 is oriented such that pressure in the central bore 26 below the seal will tend to force the leg 166 radially outward and thus the sealing lip 168 into tighter sealing engagement with the sealing surface 170. The seal 142 is preferably secured to the outer wall 36 of the tubing hanger 16 by threads 172. When the seal 142 is tightened against the tubing hanger 16, a top surface 174 of the seal will sealingly engage a step 176 that is formed in the outer wall 36. In addition, a preferably a C-shaped seal ring 178 may be positioned in a corresponding groove that is formed in the top surface 174 to provide an additional pressure barrier between the seal 142 and the tubing hanger 16. Furthermore, the flow completion system 10 may include at least one backup seal ring 180 for sealing between the tubing hanger 16 and the tubing spool 12. The seal ring 180, which is preferably a non-metallic S-type radial interference seal, is positioned in a corresponding annular recess that is formed in the outer wall 36 above the seal 142.

Thus, in the production mode of operation of the flow completion system 10, the tubing hanger supports both of the industry required first and second pressure containing barriers between the production bore and the environment. The first barrier is provided by the first plug 136 and the first seal 140, and the second barrier is provided by the second plug 138 and the second seal 142. It should be understood that the function of the first and second seals is to isolate the production bore from the environment. Therefore, either the first seal 140 or the second seal 142, or both, may comprise an annular ring seal which is positioned between the tubing hanger and the central bore concentric with the production passageway and the production outlet. An exemplary such seal is disclosed in U.S. Pat. No. 5,868,204, which is hereby incorporated herein by reference.

Therefore, a separate pressure-containing tree cap is not required to provide the second barrier. Thus, to the extent required by a specific application, a lightweight, ROV deployable tree cap may be used with the flow completion system 10. Moreover, once the tubing hanger 16 is landed in the tubing spool 12 and the plugs 136, 138 are installed, the BOP and riser which are used during installation of the tubing hanger may be removed.

Figure 6:
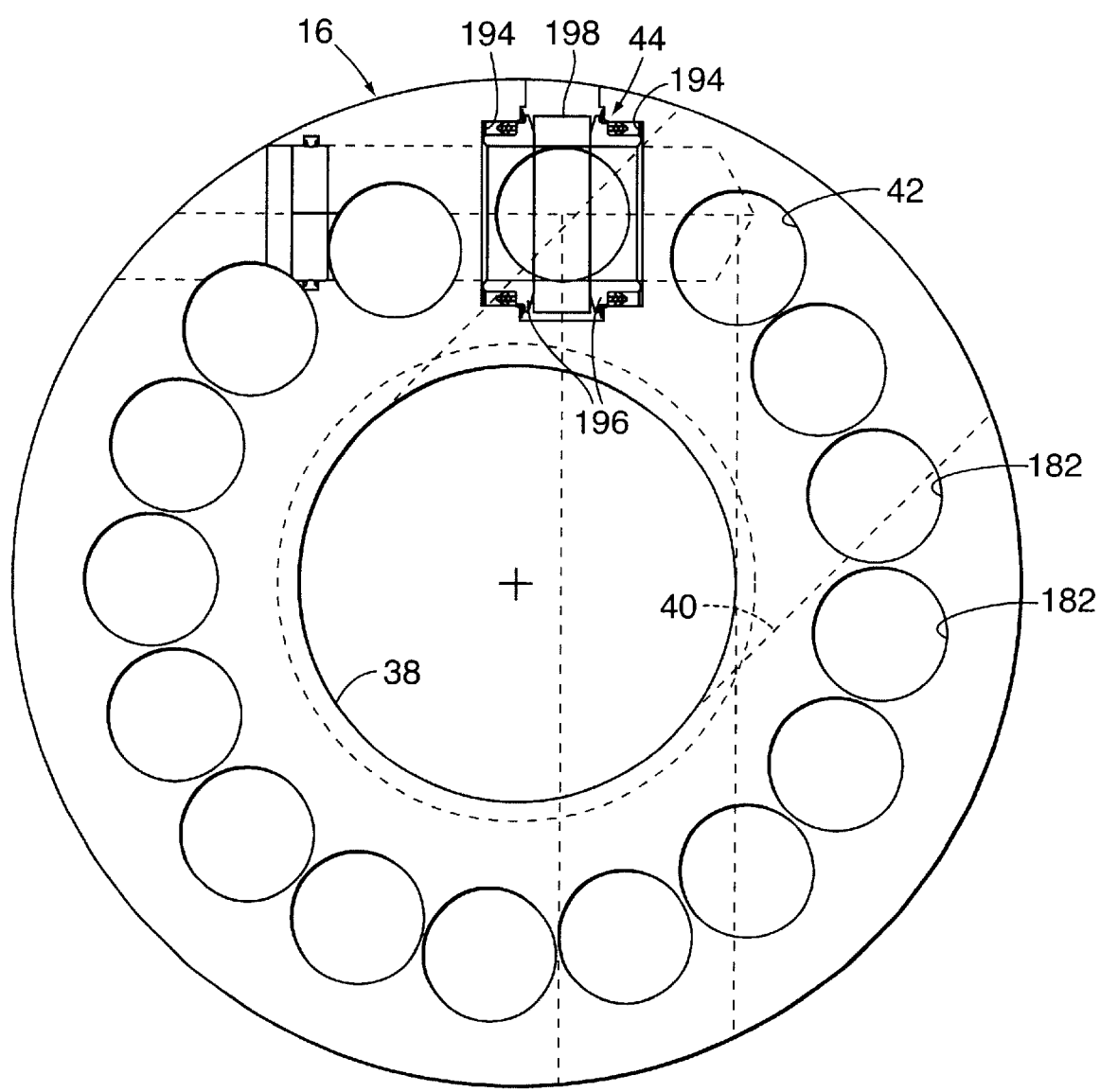
FIG. 6 is a radial cross-sectional view of the tubing hanger component of the flow completion system shown in FIG. 1.

In the embodiment of the flow completion system 10 depicted in FIG. 1, the tubing hanger 16 also comprises a number of service and control conduits 182. As shown in FIG. 6, the service and control conduits 182 are arranged radially around the central axis of the tubing hanger 16 and extend from the top of the tubing hanger generally vertically into or completely through the tubing hanger. The service and control conduits 182 provide for the communication of cables or fluids through the tubing hanger between corresponding external service and control lines (not shown) and devices or positions located in or below the tubing hanger. For example, one or more service and control conduits 182 may communicate hydraulic control fluid from a subsea control module to an operational device, such as a surface controlled subsea safety valve (not shown), which is located in the tubing string. Also, one or more service and control conduits 182 may communicate pressure from the tubing annulus 32 to an external service and control line which is connected to a pressure monitoring device located, for instance, on a surface vessel. In this context, the annulus bore 42 may be considered to be a service and control conduit.

The controls bridge 20 shown in FIG. 1 may be used in the flow completion system 10 to facilitate the connection of the service and control conduits 182 to their corresponding external service and control lines through the top of the tubing hanger 16. To this end the controls bridge 20, which is described more fully in applicants' co-pending U.S. patent application Ser. No. 09/815,431, which is hereby incorporated herein by reference, includes a number of internal bridge lines and an actuating mechanism for remotely connecting each bridge line to both a service and control conduit in the tubing hanger and a corresponding external service and control line. Consequently, the need to make these connections individually or radially through the tubing spool 12 is eliminated. In addition, the controls bridge may include one or more closure members for controlling flow through respective bridge lines, thereby eliminating the need to include these closure members on the tubing spool 12 or in the tubing hanger 16. Additionally, the controls bridge 20 is preferably sufficiently lightweight to be installed and retrieved using an ROV.

As mentioned above, the tubing hanger 16 includes at least a first closure member 44 and preferably also a second closure member 46 for controlling flow through the annulus bore 42. At least one of these closure members is preferably an active closure member, that is, one that is actuated in at least one direction by an external power source. In this respect, exemplary active closure members which may be suitable for use in the present invention include hydraulically, electrically or manually actuated ball valves, plug valves, sleeve valves, gate valves, butterfly valves or stinger valves. The other closure member may be either an active closure member or a passive closure member, the latter typically being defined as one that is actuated in one direction by the fluid contained by the closure member or by a component with which the closure member is assembled, and in the opposite direction by a return biasing means, such as a spring. Any of a variety of passive closure members may be appropriate for use with the present invention, including, but not limited to, check valves, poppet valves and flapper valves.

Figure 7:
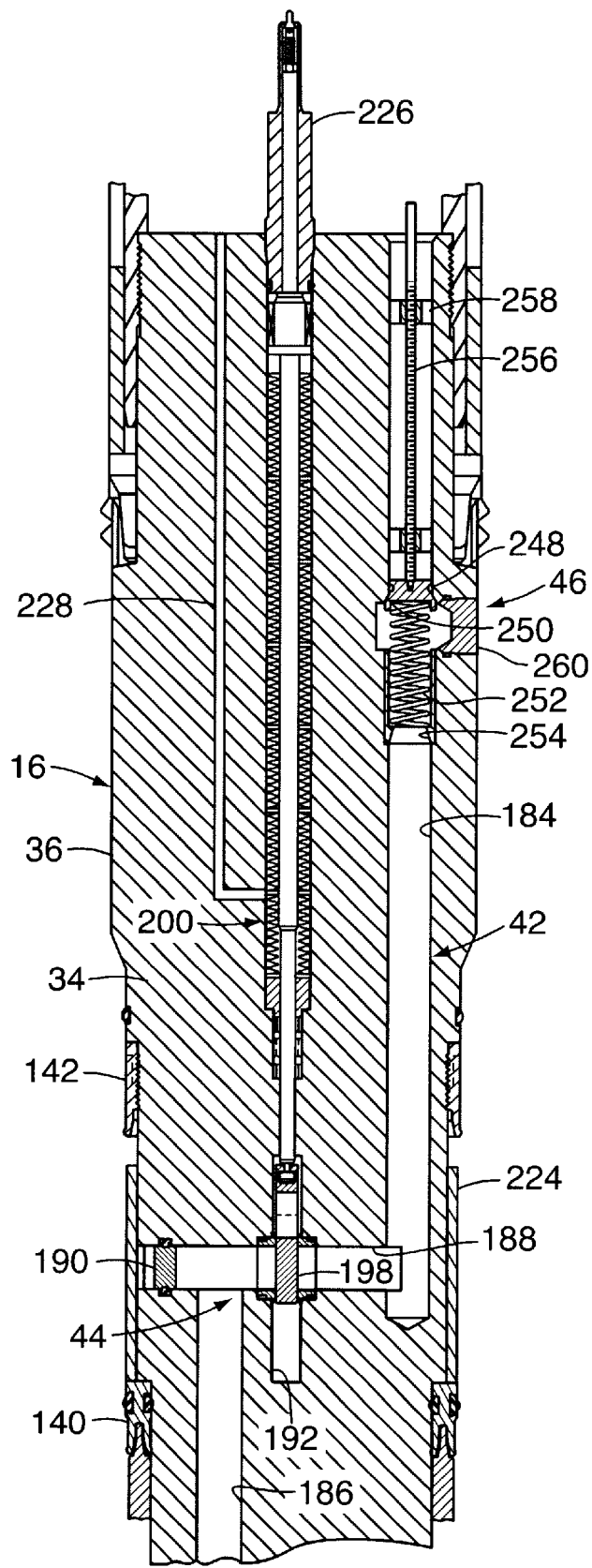
FIG. 7 is a longitudinal cross-sectional view of the tubing hanger component of FIG. 1 taken through the tubing hanger annulus bore and the annulus gate valve components of the invention.
Figure 8:
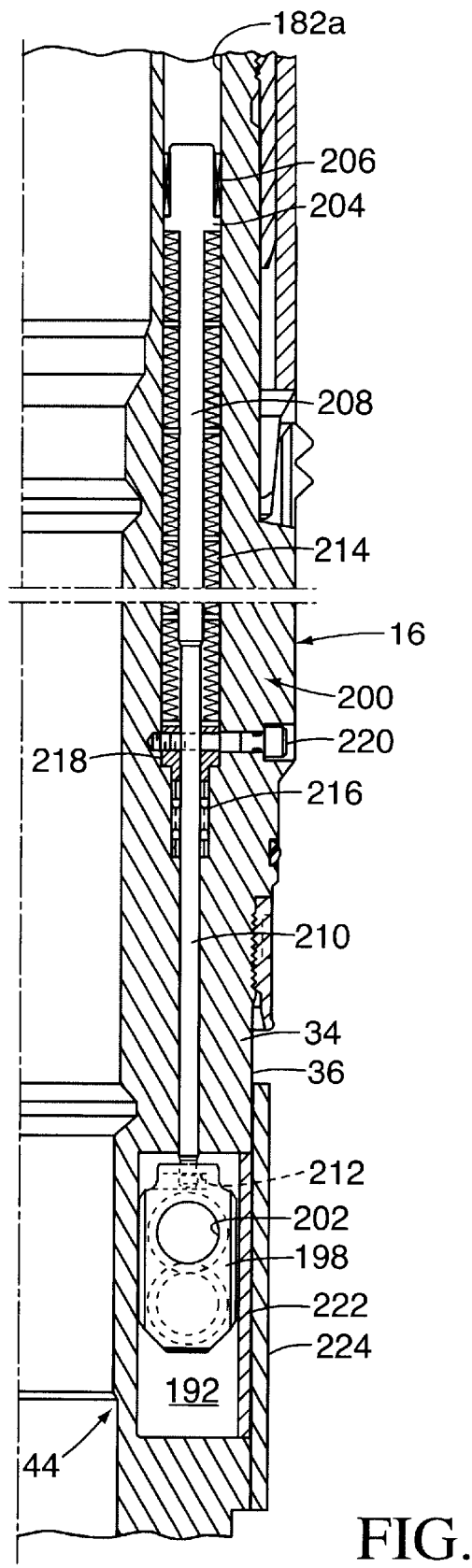
FIG. 8 is an enlarged longitudinal cross-sectional view of the annulus gate valve component shown in FIG. 7.

In accordance with a preferred embodiment of the invention, the first closure member 44 is preferably an internal gate valve which is similar to that disclosed in applicants' co-pending U.S. patent application Ser. No. 09/815,436, which is hereby incorporated herein by reference. Referring to FIGS. 6–8, the gate valve 44 is unique in that substantially all of its operational components are housed entirely within the body 34 of the tubing hanger 16. In addition, the gate valve 44 is oriented generally axially so as to occupy a minimum of the radial cross sectional area of the tubing hanger 16. In order to most readily accommodate this vertical orientation of the gate valve 44, the annulus bore preferably includes a lateral branch which is connected to a longitudinal branch, and the gate valve is disposed across the lateral branch. For example, in FIGS. 7 and 8 the annulus bore 42 is shown to comprise an upper branch 184 which extends generally axially through the body 34 to the top of the tubing hanger 16, a lower branch 186 which extends generally axially through the body to the bottom of the tubing hanger, and an intermediate branch 188 which extends generally laterally between the upper and lower branches. To facilitate the formation of the annulus bore 42, the intermediate branch 188 is ideally machined into the outer wall 36 and then sealed by a plug member 190 or any other suitable means.

The gate valve 44 comprises a generally rectangular gate cavity 192 which extends generally laterally through the outer wall 36 and intersects both the intermediate branch 188 and a service and control conduit 182a. In addition, an annular seat pocket 194 extends transversely into the body 34 from each intersection of the gate cavity 192 with the intermediate branch 188. The gate valve 44 also comprises two ring-shaped floating-type seats 196, each of which is positioned in a seat pocket 194, a gate 198 which is slidably disposed between the seats 196, and an actuating mechanism 200 which is positioned substantially in the service and control conduit 182a.

The actuating mechanism 200 functions to move the gate 198 between a valve open position in which a lateral hole 202 in the gate is aligned with the intermediate branch 188, and a valve closed position in which the hole 202 is offset from the intermediate branch 188, as shown in FIG. 7. In a preferred embodiment of the invention, the actuating mechanism 200 comprises an upper piston head 204 which supports a seal 206 that engages the service and control conduit 182a, an elongated piston rod 208 which is connected to the bottom of the piston head 204, a valve stem 210 which is connected between the lower end of the piston rod 208 and the top of the gate 198, for example via a T-slot connection 212, and a return biasing mechanism, which in the embodiment of the invention shown in FIGS. 7 and 8 is a mechanical biasing means such as a stack of Belleville washers 214. In addition, the valve stem 210 is preferably sealed against the service and control conduit 182a by a suitable packing 216, which is held in place by a gland nut 218 that in turn is secured to the body 34 by suitable means, such as a retainer screw 220.

The opening that the gate cavity 192 forms in the wall 36 is optimally closed by a simple cover plate 222 which is held in place by a cylindrical sleeve 224 that is telescopically received over the tubing hanger 16. The pressure in the gate cavity 192 is therefore preferably contained within the first and second seals 140, 142 which are used to seal the tubing hanger to the tubing spool, in addition to the packing 216. Consequently, no need exists for separate sealing means between the body 34 and either the cover plate 222 or the sleeve 224 to contain the pressure within the gate cavity 192. However, the present invention contemplates that one or more such seals could be provided between the body 34 and either the cover plate 22 or the sleeve 224, to contain the pressure within the gate cavity 192, especially when the opening that the gate cavity makes in the wall 36 is not located between the seals 140, 142. In addition, instead of the cover plate 222 being retained by the sleeve 224, the sleeve could be dispensed with and the cover plate simply bolted onto the body, in which event seals are preferably provided between the cover plate and the body 34 to retain the pressure within the gate cavity 192.

In operation, the gate valve 44 is normally in the closed position. When it is desired to open the annulus bore 42, a pressure sufficient to overcome the combined force of the return biasing means 200 and the friction at the various interfaces of the gate valve is introduced into the service and control conduit 182a above the piston head 204. As shown in FIG. 7, a male coupling 226 may be installed in the top of the service and control conduit 182a to facilitate connecting a pressure source, such as a high pressure hydraulic fluid source, to the service and control conduit. The male coupling 226 is engaged by a corresponding female coupling (not shown) which is mounted in either the running tool 76 or the controls bridge 20 and which in turn is connected to the pressure source by a corresponding external service and control line in a conventional fashion. Alternatively, the top of the service and control conduit 182a may merely include a seal profile for a stab which is carried on the running tool or the controls bridge and is connected to the pressure source by conventional means. The pressure in the service and control conduit 182a will force the piston head 204 downward and thus move the gate 198 into the open position. In this position, fluid in the tubing annulus 42 is allowed to flow from the lower branch 186, through the intermediate branch 188 and into the upper branch 184, where it will encounter the closure member 46 if present. As shown in FIG. 7, the tubing hanger 16 preferably includes a compensation port 228 which extends between the top of the tubing hanger and a portion of the service and control conduit 182a that is located below the piston head 204. While not shown in the drawings, a male coupling or stab profile may be provided at the top of the compensation port 228 to facilitate the connection of this port through the running tool or the controls bridge with a corresponding external service and control line.

When it is desired to close the gate valve 44, the pressure is removed from the service and control conduit 182a, whereupon the force from the return biasing mechanism 214 combined with the pressure in the annulus bore 42 acting on the stem 210 will push the piston head 204 upward and move the gate 198 into the closed position. If the means supplying the pressure to the service and control conduit 182a should fail for any reason, the return biasing mechanism 214 will either retain the gate 198 in the closed position or move the gate from the open position to the closed position. Thus, in the preferred embodiment of the invention the gate valve 44 is a "fail closed" device.

In an alternative embodiment of the gate valve 44 which is not specifically illustrated in the drawings, the actuating mechanism 200 is a pressure balanced operating mechanism. Consequently, the return biasing mechanism 214 would not be required. Instead, the compensation port 228 is connected to a pressure source in the same manner that the service and control conduit 182a is connected to a pressure source. In order to return the gate valve to the closed position, therefore, pressure is introduced into the compensation port 228 to force the piston head 204, and thus the gate 198, upward. In this embodiment, the gate valve 44 would be a "fail as is" device.

Figure 9:
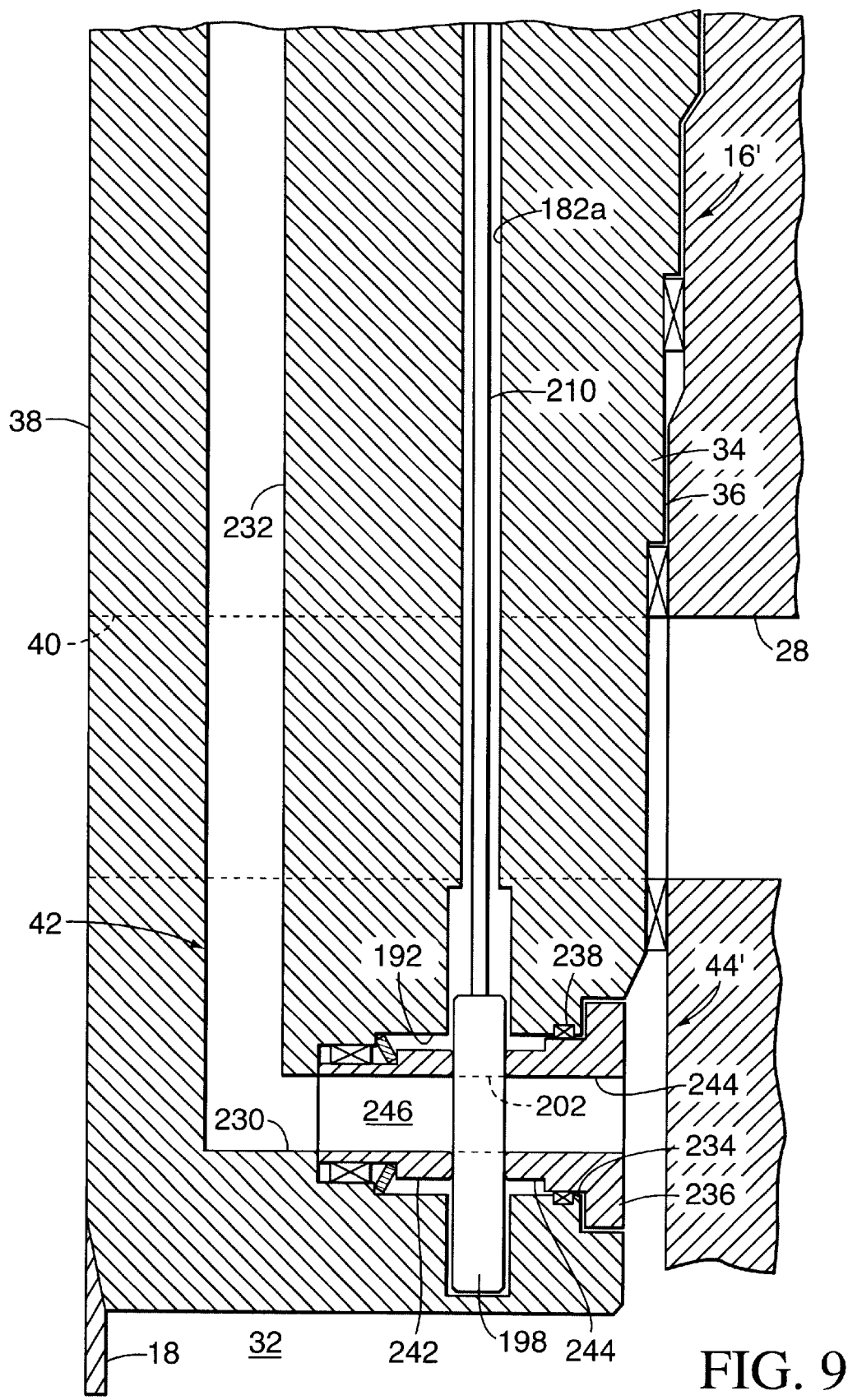
FIG. 9 is a partial longitudinal cross-sectional view of another embodiment of a tubing hanger component of the present invention comprising an alternative annulus gate valve.

Referring now to FIG. 9, an alternative gate valve 44' which is suitable for use with the present invention is shown installed in a tubing hanger 16'. In this embodiment the tubing hanger 16' is shown to comprise an annulus bore 42 having a first branch 230 which extends generally laterally through the tubing hanger from the tubing annulus 32, and a second branch 232 which extends from the first branch to the top of the tubing hanger. In addition, the gate valve 44' comprises a gate cavity 192 that extends laterally through the wall 36 of the tubing hanger generally coaxially with the first branch 230. The gate cavity 192 forms an opening 234 in the wall 36 which is preferably closed by a cover 236 that is ideally removably attached to the tubing hanger using any suitable means, such as bolts (not shown). In addition, the cover 236 is optimally sealed to the tubing hanger with at least one annular seal 238.

In the embodiment of the invention depicted in FIG. 9, the gate valve 44' is shown to comprise a gate 198 which is slidably disposed across the first branch 230 between a pair of seats 240, 242. The first seat 240 is similar to the seats 196 discussed above. The second seat 242 can be identical to the first seat 240 or, as shown in FIG. 9, it can comprise an annular body which is attached to or formed integrally with the cover 236. In either event, the cover 236 preferably includes a port 244 which aligns with the through bores in the seats 240, 242 to define a flow passage 246 through the gate valve 198 which extends between the tubing annulus 32 and the first branch 232.

The gate valve 44' further includes an actuating mechanism to move the gate 198 between a closed position, in which a lateral hole 202 in the gate is offset from the flow passage 246, to an open position, in which the hole 202 is aligned with the flow passage, as shown in FIG. 9. The actuating mechanism (not shown) is positioned in a service and control conduit 182a that is oriented generally vertically over the gate 198. In addition, the actuating mechanism, which can be similar to any of the actuating mechanisms discussed above, is connected to the gate 198 via a valve stem 210.

Although not illustrated in FIG. 9, it should be understood that other configurations of the gate valve are within the scope of the present invention. For example, the gate cavity could extend longitudinally into the tubing hanger from the bottom thereof. Thus, the gate cavity would intersect the first branch and provide a convenient means for installing the seats in the first branch. In this example, the cover which is used to close the opening that the gate cavity makes in the bottom of the tubing hanger would not include a port. Rather, the first branch would communicate directly with the tubing annulus through the wall of the tubing hanger.

Also, although not depicted in the Figures, other configurations of the annulus bore 42 are considered to be within the scope of the present invention. For example, the first branch of the annulus bore could extend generally laterally through the tubing hanger and communicate with the portion of the central bore of the tubing spool that is located above the seals which are employed to seal the tubing hanger to the tubing spool. In this example, the second branch would extend generally longitudinally from the first bore down through the tubing hanger to the tubing annulus. In addition, the gate valve would preferably be installed in or near the top of the tubing hanger.

Referring again to FIG. 7, the closure member 46 is preferably a sting-open check valve which is mounted in the upper branch 184 of the annulus bore 42. The check valve 46 comprises an annular head 248 which is adapted to seal against a corresponding conical seat 250 that is formed in the upper branch 184, a coil spring 252 which is preferably supported in a collet 254 that in turn is mounted in the upper branch, a stem 256 which is connected to the head and which extends through the upper branch toward the top of the tubing hanger 16, and at least one radial stabilizer fin 258 which is secured to the stem above the head. The spring 252 urges the head 248 into sealing engagement with the seat 250 to thereby close the upper branch 184. In order to open the upper branch, a stinger or similar member (not shown) is inserted into the top of the upper branch and against the stabilizer fin 258 to thereby push the head 248 off of the seat and into the open position. In order to facilitate the assembly of the check valve 46, the outer wall 34 of the tubing hanger 16 may include a lateral opening which is sealed by a preferably removable plug 260.

As an alternative to the closure member 46, the flow completion system 10 may comprise a simple debris valve which is mounted in the top of the upper branch 184 to prevent debris from falling into the annulus bore when the tubing hanger running tool is removed from the tubing hanger but allow fluid to pass through the upper branch when the annulus bore is connected to an external conduit, such as an external service and control line. The construction and operation of the debris valve are explained more fully in applicants' co-pending U.S. patent application Ser. No. 09/815,436.

Figure 12:
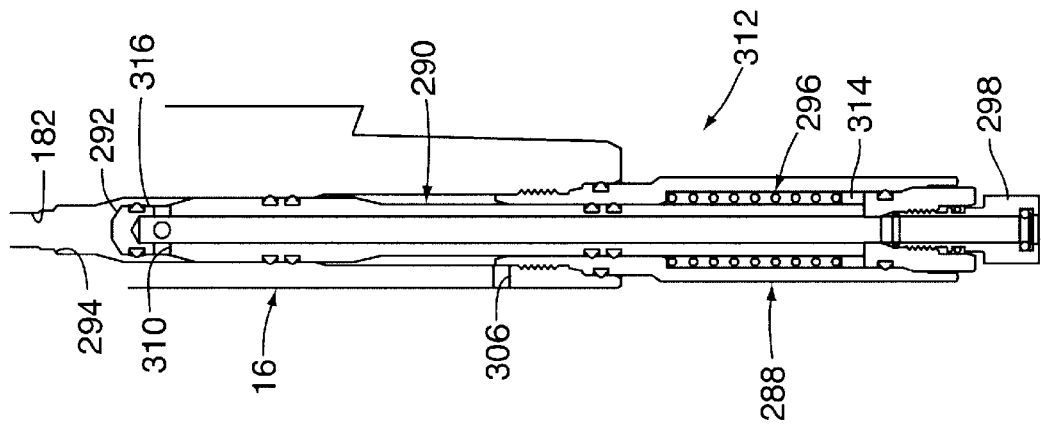
FIG. 12 is an enlarged sectional view of another embodiment of a service and controls conduit plug valve which is suitable for use with the present invention.
Figure 11:
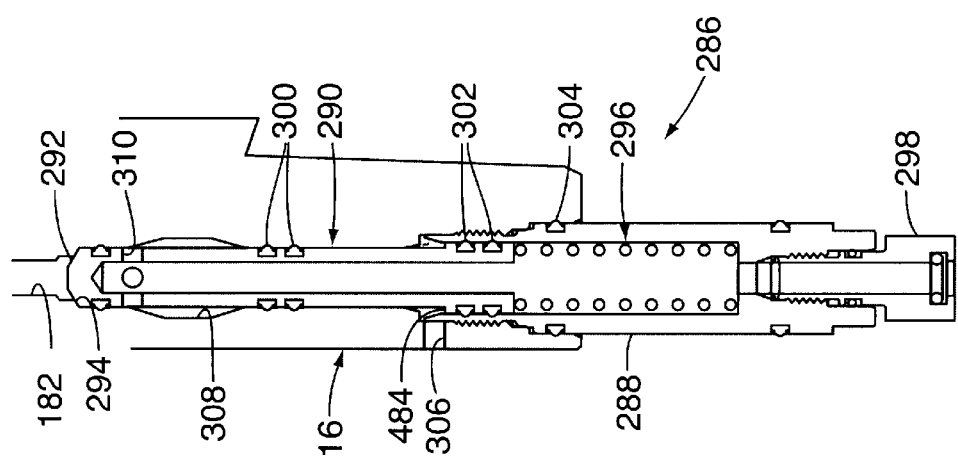
FIG. 11 is an enlarged sectional view of one embodiment of a service and controls conduit plug valve which is suitable for use with the present invention.
Figure 10:
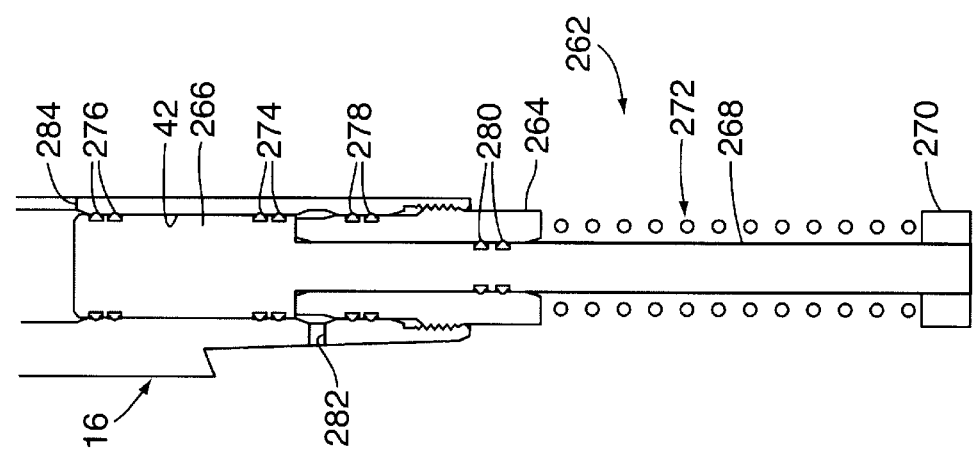
FIG. 10 is an enlarged sectional view of an alternative annulus closure member which is suitable for use with the present invention.

FIGS. 10–12 illustrate three alternative closure members which may be used to control flow through the annulus bore 46 or the service and control conduits 182. The closure member 262 shown in FIG. 10 is an annulus plug valve which comprises a cylindrical sleeve 264 that is secured in the bottom of the annulus bore 42, a head 266 which is slidably received in the bottom of the annulus bore above the sleeve, a stem 268 which extends through the sleeve between the head and a flange 270, and a coil spring 272 which is operatively engaged between the bottom of the sleeve and the flange to urge the head against the top of the sleeve. The head 266 supports two pairs of axially spaced apart seals 274, 276 that seal against the annulus bore 42. In addition, a third pair of seals 278 is positioned between the sleeve 264 and the annulus bore and a fourth pair of seals 280 is positioned between the stem 268 and the sleeve 264. In operation, hydraulic pressure is introduced through a port 282 and into a piston chamber which is formed between the seals 274, 278 and 280 to urge the head 266 in to the closed position, in which the seals 274, 276 will straddle an inlet 284 between the tubing annulus and the annulus bore 42 to thereby close the annulus bore 42. In the absence of hydraulic pressure in the piston chamber, the spring will force the head 266 downward into the its open position. Thus, the plug valve 262 is preferably a "fail open" device.

The closure member 286 shown in FIG. 11 is, for example, a chemical injection valve that is used to control the flow of a chemical through a corresponding service and control conduit 182. The valve 286 comprises a support sleeve 288 that is secured and sealed in the bottom of a service and control conduit 182, a cylindrical seal body 290 which is slidably received within both the conduit 182 and the sleeve 288 and which includes a conical sealing head 292 that engages a corresponding seat 294 which is formed in the conduit 182, a coil spring 296 which is operatively engaged between the sleeve 288 and the body 290 to urge the head into sealing engagement with the seat, and a suitable fitting 298 which is attached to the seat and through which a conduit that extends down hole may be connected to the valve 286. In addition, the valve 286 includes at least one first seal 300 which is positioned between the body 290 and the conduit 182, at least one second seal 302 which is positioned between the body and the sleeve, and at least one third seal 306 which is mounted between the sleeve and the body 34 of the tubing hanger 16. In operation, hydraulic pressure is introduced through a port 306 and into a piston chamber that is formed between the seals 300, 302 and 304 to force the body 290 downward, which will pull the head 292 off of the seat 294 and thereby open the valve 286. In this position, fluid in the conduit 182 will flow past the head 292, into an expansion 308 which is formed in the conduit 182, through a number of inlets 310 that are formed in the body 290 below the head, through the body, through the sleeve 288, and out through the fitting 298. In the absence of hydraulic pressure in the piston chamber, the spring 296 will force the body 290 into the closed position. Thus, the valve 286 is a "fail closed" device. Moreover, in this condition the valve 286 may be opened by applying sufficient pressure in the conduit 182 above the valve to overcome the force of the spring 296.

The closure member 312 depicted in FIG. 12 is shown to be similar in many respects to the valve 286 discussed above. However, in valve 312 a radial flange 314 is attached to the lower portion of the seal body 290, and the spring 296 is operatively engaged between the sleeve 288 and the flange to urge the seal body downward. This will pull the sealing head 292 off of the seat 294 and into the open position shown in FIG. 12. In addition, instead of the expansion 308 in the conduit 182, the upper diameter of the body 290 is reduced as at 316 to allow fluid in the conduit 182 to flow past the head 292 and into the inlets 310. Moreover, the valve 312 is preferably a "pilot to close" valve; therefore, if pressurized fluid exists within the conduit that is connected to the fitting 298, the plug valve will remain in the closed position. Also, in the event of a failure of the means for supplying hydraulic pressure to the valve 312, the spring 296 will maintain the body 290 in the open position. Thus, the valve 312 is a "fail open" device.

In order to provide an effective barrier between the well bore and the environment, the tubing hanger 16 preferably includes one of the aforementioned closure members to control the flow through each service and control conduit 182 that extends completely through the tubing hanger to other than a down hole valve. The closure member will therefore act as an initial barrier between the well bore and the environment through the service and control conduit. This barrier is in addition to the barrier which is provided by a conventional fluid coupling that is typically installed in the service and control conduit. As is known in the art, the conventional fluid coupling includes a poppet-type valve which will close when the coupling is disengaged from a corresponding coupling that is installed in a tubing hanger running tool, a controls bridge or a radial penetrator. As an alternative to employing an individual closure member in each service and control conduit 182, the flow completion assembly 10 may comprise a multiport gate valve assembly to control the flow through a number of service and control conduits simultaneously. Such a gate valve assembly, which is shown as 318 in FIG. 1, is described in applicants' co-pending U.S. patent application Ser. No. 09/815,395, which is hereby incorporated herein by reference. With closure members such as the above in place in the service and control conduits 182, the tubing spool 16 will contain both of the industry required first and second barriers between the well bore and the environment.

Figure 13:
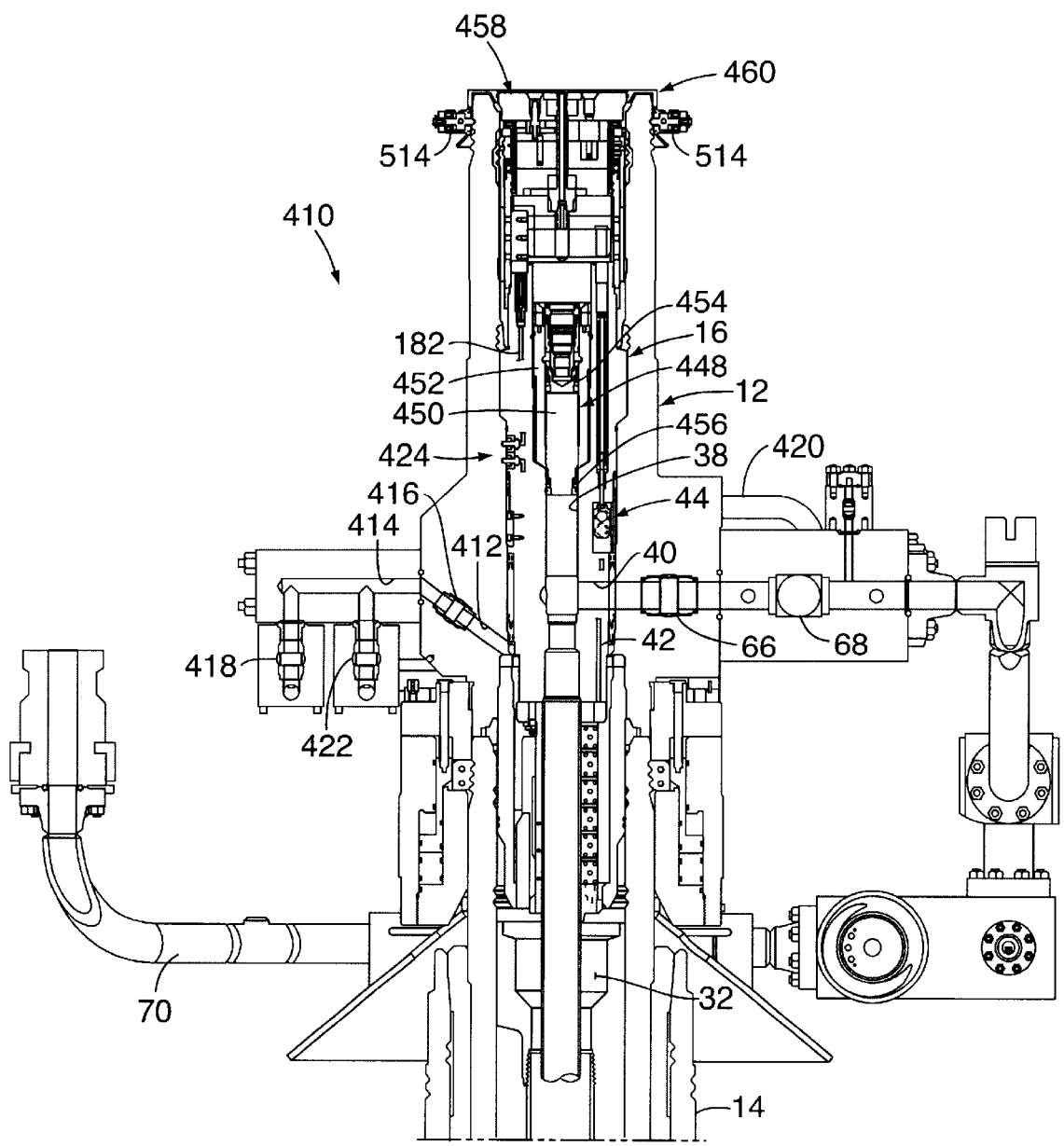
FIG. 13 is a longitudinal cross-sectional view of another embodiment of the flow completion system of the present invention.

Referring now to FIG. 13, another embodiment of a flow completion system of the present invention is shown which is similar in many respects to the flow completion system 10 described above. However, the flow completion system of this embodiment, which is indicated generally by reference number 410, also comprises an annulus passageway 412 which extends through the tubing spool 12 between the tubing annulus 32 and an annulus outlet 414, an annulus master valve 416 for controlling flow through the annulus passageway, an annulus wing valve 418 for controlling flow through the annulus outlet, a crossover line 420 which extends from the annulus outlet to a portion of the flow passageway 64 that is located between the production valves 66 and 68, and a crossover valve 422 for controlling flow through the crossover line. The valves 416, 418 and 422 may be any of the closure members discussed above, but they are preferably remotely operable gate valves. In addition, the valves may be mounted in the tubing spool 12, mounted in one or more valve blocks that are attached to the tubing spool, or mounted individually on the tubing spool. With the above-described arrangement of the flow completion system 410, the pressure within the tubing annulus 32 can be monitored through the annulus passageway 412 during production, and fluids can be circulated between the production bore 38 and the tubing annulus through the annulus passageway and the crossover line 420 during installation and workover.

The flow completion system 410 may also include one or more male radial penetrator couplings 424, each of which is connected to a corresponding service and control conduit 182 within the tubing hanger 16. The male couplings 424 are mounted on the outer wall 36 of the tubing hanger in a conventional fashion, and each male coupling is releasably connectable with a corresponding female coupling (not shown) which is carried by a conventional radial penetrator assembly that is mounted on the tubing spool 12. Thus, when the tubing hanger is landed on the tubing spool, the penetrator assembly may be actuated to bring the female couplings into engagement with their corresponding male couplings 424 to thereby establish communication between the service and control conduits 182 in the tubing hanger 16 and the external service and control lines to which the female couplings are connected.

Figure 14:
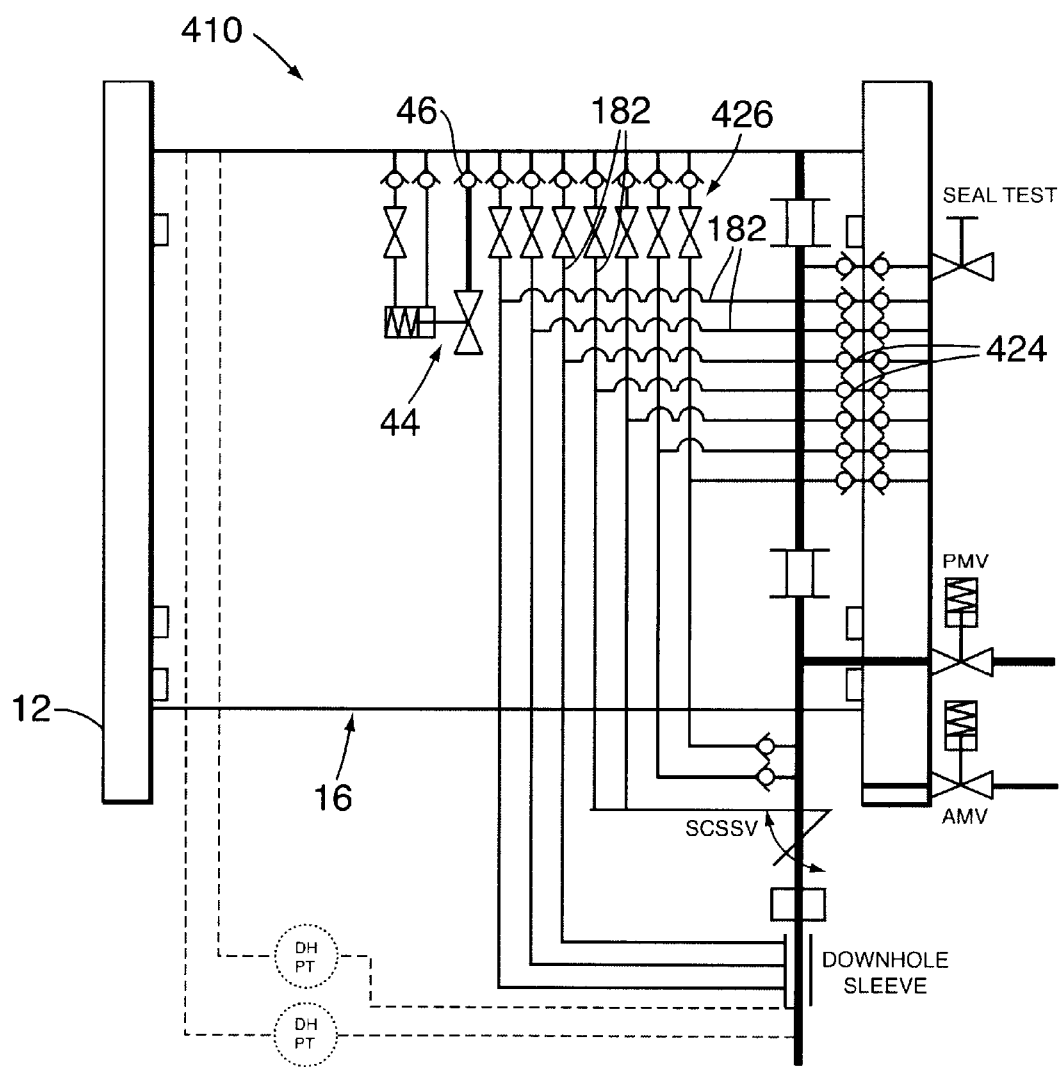
FIG. 14 is a schematic representation of the flow completion system shown in FIG. 13.

In addition, as shown schematically in FIG. 14, one or more of the service and control conduits 182 which is connected to a radial penetrator coupling 424 may be routed within the body 34 of the tubing hanger 16 to a corresponding axial service and control conduit 182 that enters from the top of the tubing hanger. In this manner, a device with which a tubing hanger running tool communicates during installation of the tubing hanger 16, for example a surface controlled subsea safety valve ("SCSSV"), can be monitored during installation of the tubing hanger and then connected to an external service and control line through the radial penetrator once the running tool is disconnected from the tubing hanger. A conventional poppet-type fluid coupling may be installed in each vertical service and control conduit 182 to seal the conduit once the running tool is disconnected. Alternatively, a fluid coupling 426 which comprising both a poppet valve and a gate valve may be employed in each such service and control conduit. Such a coupling, which is described more fully in applicants' co-pending U.S. patent application Ser. No. 09/844,579, which is hereby incorporated herein by reference, will provide two barriers between the well bore and the environment through the service and control conduit.

Figure 15:
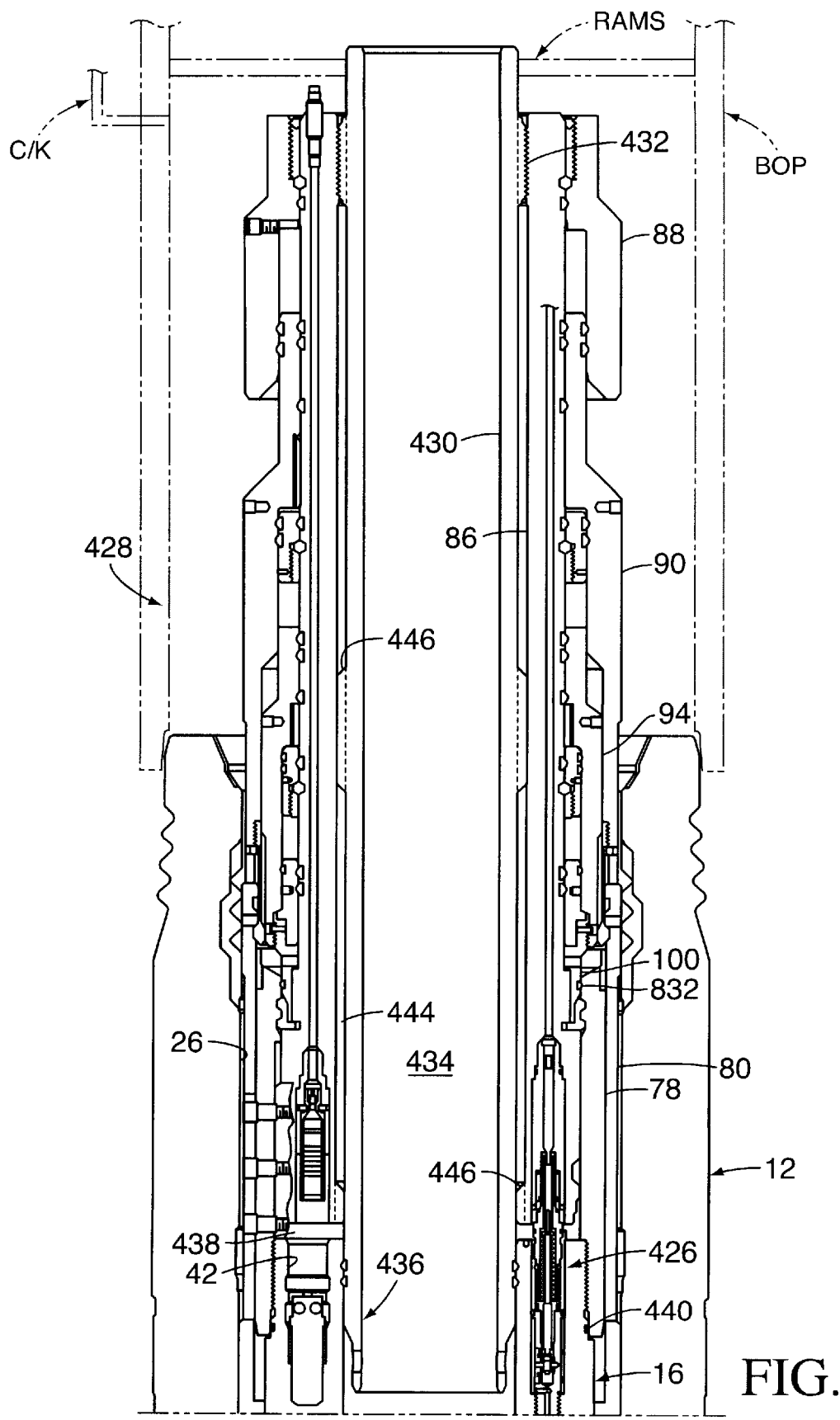
FIG. 15 is an enlarged view of the top portion of the flow completion system shown in FIG. 14, but with the tree cap component removed and with a running tool connected to the top of the tubing hanger component of the invention.

Referring to FIG. 15, the tubing hanger 16 of the flow completion system 410 is preferably installed using a tubing hanger running tool 428. The running tool 428 is similar in most respects to the running tool 76 discussed above, including in the means and manner by which the running tool is connected to the tubing hanger 16. However, the running tool 428 also includes a tubular member 430 which is secured within the body 86 such as by threads 432. The tubular member 430 defines a production port 434 within the running tool 428 which communicates with a riser (not shown) in a manner well understood by those of skill in the art. In addition, the bottom of the tubular member 430 forms a production seal stab 436 which, when the running tool is connected to the tubing hanger 16, is received in the top of the production bore 38 to connect the production port 434 with the production bore.

Furthermore, when the running tool 428 is connected to the tubing hanger 16, the bottom of the body 86 is spaced apart from the top of the tubing hanger to thereby form an annular gallery 438 which is in communication with the tubing hanger annulus bore 42. The gallery 438 is sealed from the environment by both a lower annular isolation seal 440, which is engaged between the tubing hanger 16 and the upper extension 78, and an upper annular isolation seal 442, which is engaged between the upper extension and the outer diameter of the wedge ring 100. The seals 440, 442 may be any suitable seals, but are preferably nonmetallic face seals. Also, the outer diameter of the tubular member 430 is designed to be smaller than the inner diameter of the body 86 in order to form an annular volume or "annulus port" 444 between these two members which extends between the gallery 438 and the top of the body. The spacing between the tubular member and the body is ideally maintained by a number of fluted centralizers 446 which may be attached to or formed integrally with either the tubular member or the body. Moreover, the threads 432 which secure tubular member 430 to the body 86 are fluted to allow for fluid to pass through this connection. In this manner, when a BOP (not shown) is connected to the tubing spool 12 and the BOP rams are closed around the tubular member 430 or the retention sleeve 88, fluid communication between the BOP choke and kill line and the tubing hanger annulus bore 42 may be established through the annulus port 444 and the gallery 438.

Referring again to FIG. 13, the flow completion system 410 may optionally comprise a single "dual-sealing" wireline plug 448 to seal the production bore 38 above the production passageway 40. The dual-sealing plug 448 comprises a wireline deployable plug body 450 which is removably connectable within a bore insert 452 that is secured and sealed in the production bore 38. In addition, the dual-sealing plug 448 includes a first annular sealing assembly 454 for sealing between the body 450 and the bore insert 452, and a second annular sealing assembly 456 for sealing between the body and, preferably, the production bore 38. Moreover, the first and second sealing assemblies 454, 456 each ideally include at least one metal straight-bore type ring seal. In this manner, the single plug 448 performs the function of the two individual plugs 136,138 discussed above. However, only one running trip is required to install or remove the plug 448, as opposed to separate trips to install or remove each of the plugs 136,138.

The flow completion apparatus 410 preferably comprises a light-weight, non pressure-containing tree cap 458 which is installed in the tubing spool 12 above the tubing hanger 16, and an optional debris cap 460 which is installed on the tubing spool 12 above the tree cap 458. Referring to FIGS. 16 and 16A–16C, the tree cap 458 is shown to comprise an annular body 462 which includes a number of radial sections that are secured together by a plurality of longitudinal bolts 464. The body 462 is preferably manufactured from a non-metallic material, such as an ultra-high molecular weigh polyethylene which has a very low water adsorption rate on the order of about 0.03% in the 24 hour ASTM D570 test. This material not only makes the tree cap 458 lightweight, thereby allowing the tree cap to be installed by an ROV, but also isolates the tree cap from the cathodic protection system of the flow completion apparatus. Moreover, any longitudinal forces acting on the tree cap will be borne by the bolts 464, thereby relieving the body 462 of this function.

Figure 16:
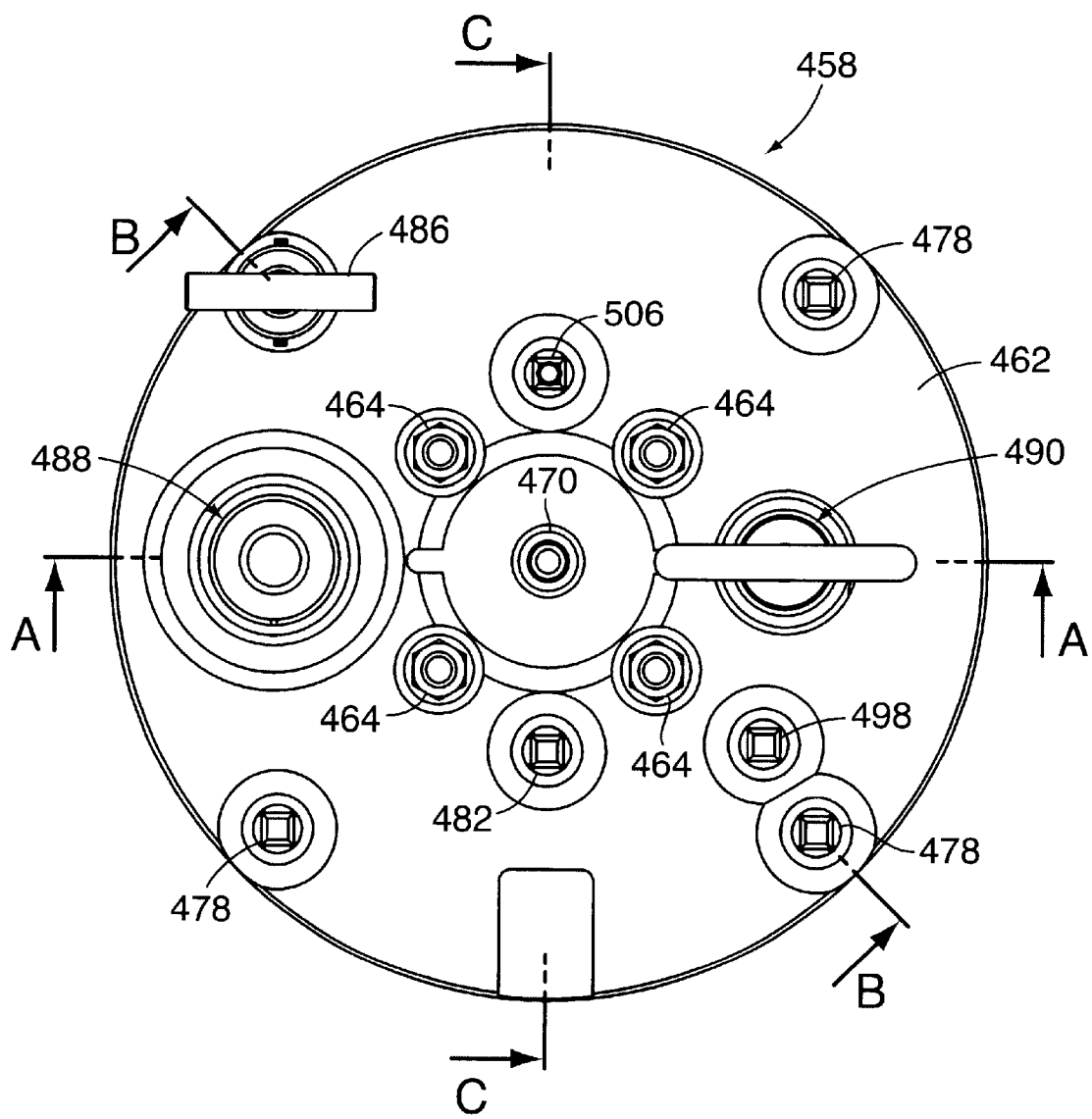
FIG. 16 is a top view of the tree cap component of the flow completion apparatus shown in FIG. 13.
Figure 16A:
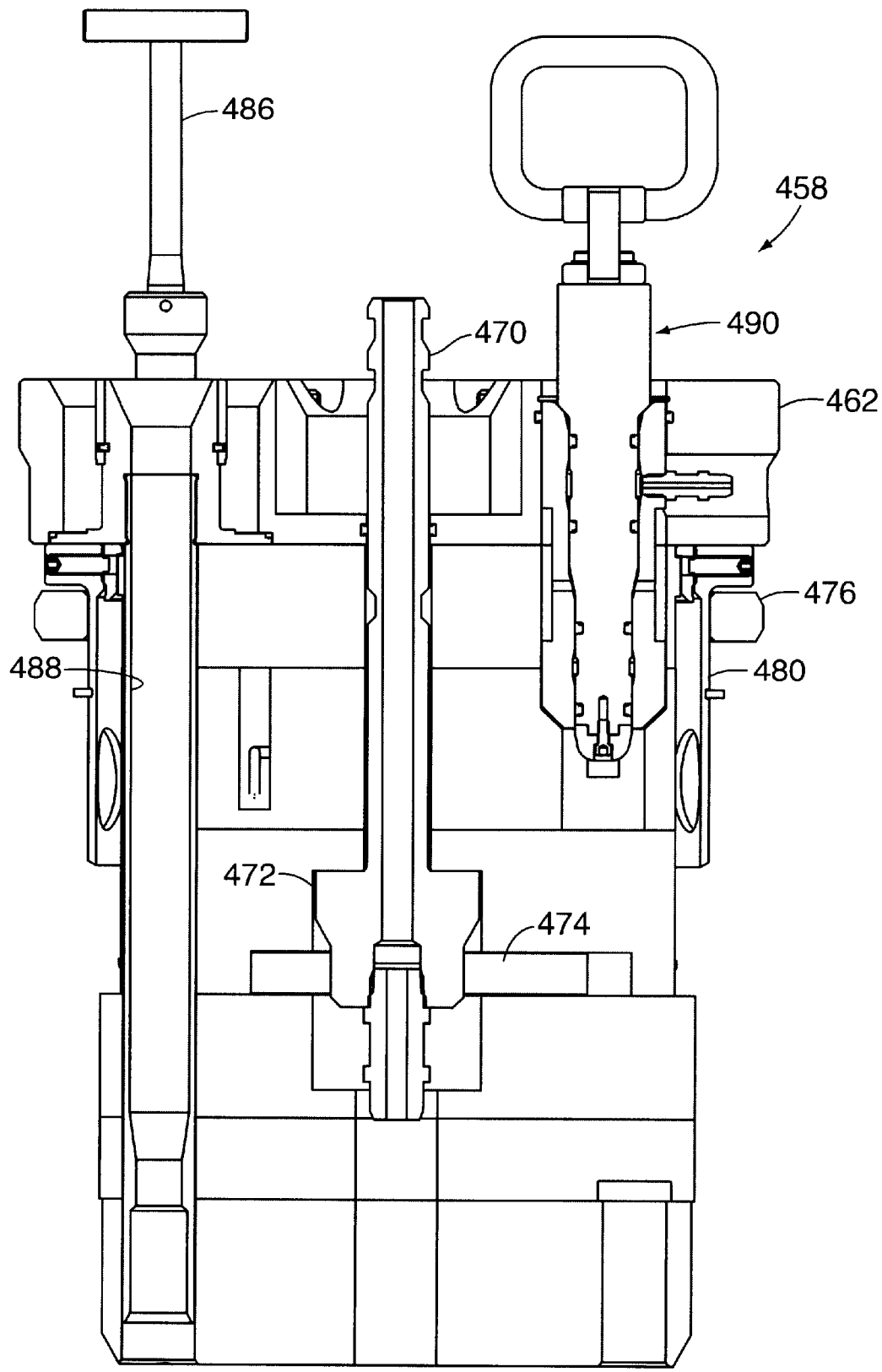
FIG. 16A is a cross-sectional view of the tree cap taken along line A—A of FIG. 16.
Figure 16B:
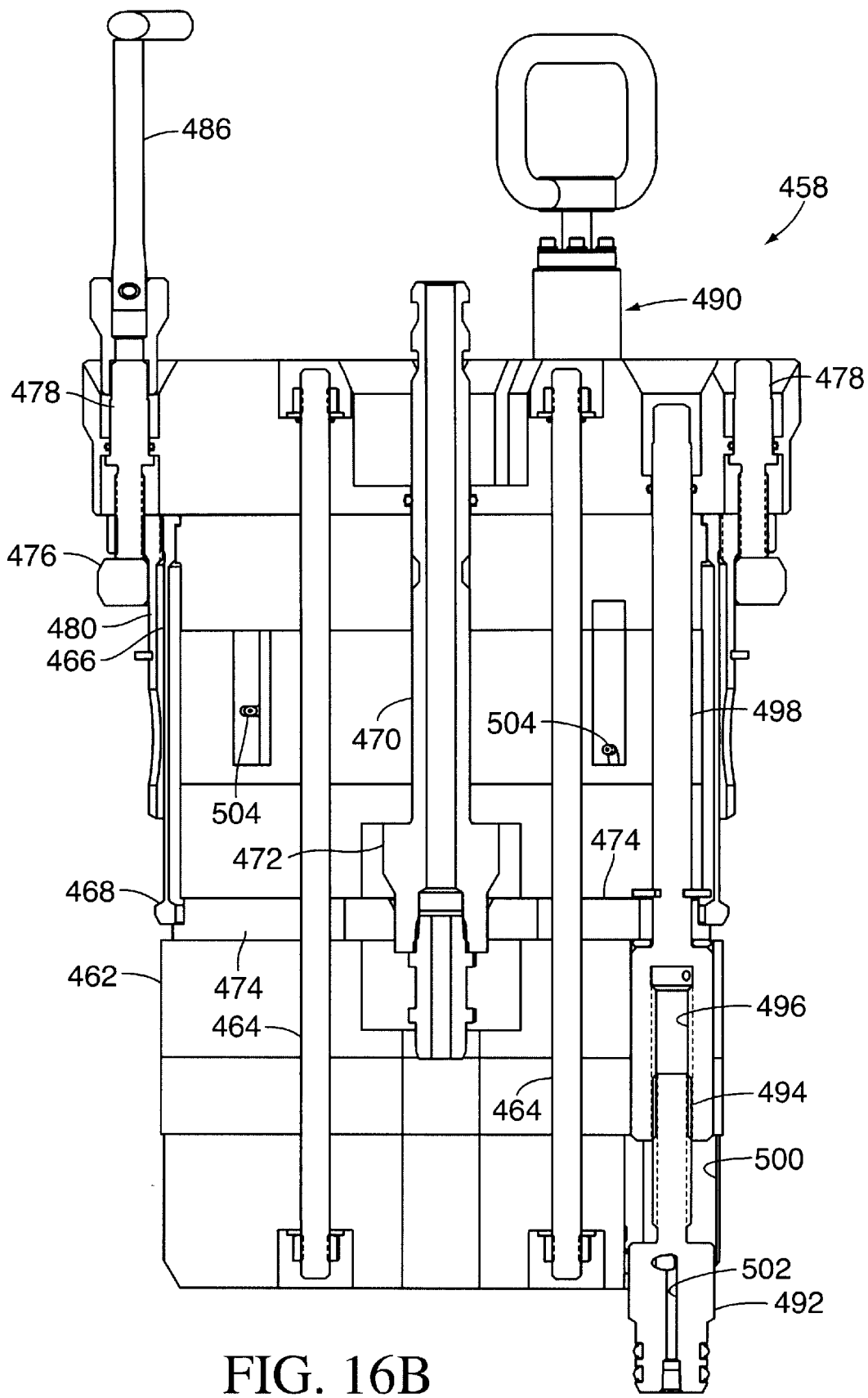
FIG. 16B is a cross-sectional view of the tree cap taken along line B—B of FIG. 16.
Figure 16C:
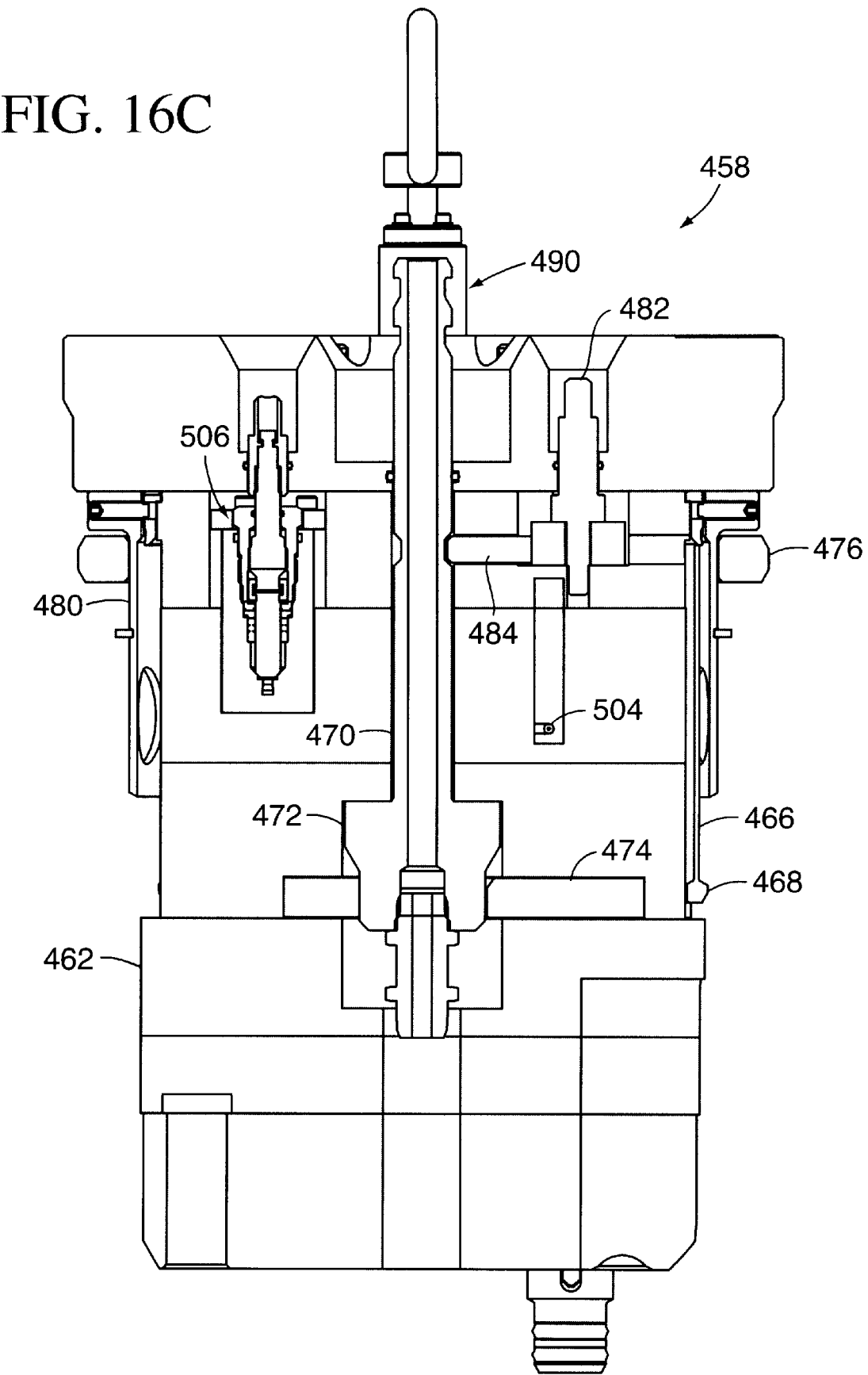
FIG. 16C is a cross-sectional view of the tree cap taken along line C—C of FIG. 16.

Referring specifically to FIG. 16B, the tree cap 458 also comprises a collet sleeve 466 which is threaded onto the outer diameter of the body 462 near the top of the tree cap. The collet sleeve 466 includes a number of downwardly depending collet fingers 468 which are adapted to engage a corresponding groove that is formed in the upper extension 78 of the tubing hanger 16 when the tree cap 458 is landed in the tubing spool 12. The tree cap further includes an elongated lock mandrel 470 which comprises a camming ring 472 that is attached to a lower end thereof, a plurality of locking dogs 474 which are slidably received in corresponding radial apertures that are formed in the body 462, and a landing ring 476 which is secured by a number of lock down screws 478 in a support sleeve 480 that is threaded onto the collet sleeve 466. Also, as shown in FIG. 16C, the tree cap 458 preferably includes a key 482 that comprises a radially extending tongue 484 which is received in a corresponding recess that is formed on the lock mandrel 470. The key 482 serves to maintain the lock mandrel 470 in the up position until the tree cap 458 is landed in the tubing spool 12.

When the tree cap 458 is landed in the tubing spool 12, the landing ring 476 will land on the top of the tubing hanger locking mandrel 80 and the collet fingers 468 will enter their corresponding groove on the upper extension 78. After the ROV turns the key 482 to release the lock mandrel 470, the lock mandrel is pushed downward by an ROV handling tool (not shown) to force the camming ring 472 against the locking dogs 474, which in turn will move radially outwardly against the collet fingers 468 to secure the collet fingers in their groove. The longitudinal spacing between the landing ring 476 and the collet fingers 468 can be adjusted using the lockdown screws 478. Also, once the tree cap 458 is secured to the tubing hanger 16, the lock down screws 478 can be tightened by an ROV torque tool 486 to firmly secure the landing ring 476 against the tubing hanger locking mandrel 80. In this manner, the landing ring 476 will function to maintain the tubing hanger locking mandrel 80 in the locked position.

As shown in FIG. 16A, the tree cap 458 can include a conduit 488 which comprises a locking profile for an electrical connector. Thus, the tree cap can facilitate connecting an external electrical service and control line to a corresponding service and control conduit in the tubing hanger 16. The tree cap 458 may also include an ROV hot stab 490 through which a corrosion inhibitor may be injected into the central bore 26 of the tubing spool 12 around the tree cap.

As shown in FIGS. 16B and 16C, the tree cap 458 may also comprise an annulus seal stab 492. The seal stab 492 ideally comprises a threaded stem 494 which is received in a corresponding threaded receptacle 496 that is attached to the lower end of an actuating shaft 498. In addition, the seal stab 492 is optimally keyed to a surrounding receptacle 500 in a manner which prevents rotation but permits longitudinal movement of the seal stab relative to the receptacle. Thus, rotation of the actuating shaft by a suitable ROV tool (not shown) will move the seal stab 492 downward into engagement with, for example, the annulus bore 42 in the tubing hanger 16. The seal stab 492 may be a blind stab, in which event it functions to provide a backup barrier to the annulus bore 42. Alternatively, the seal stab 492 may comprise a through bore 502 which communicates through a corresponding conduit 504 with a fluid coupling 506 that is mounted in the top of the tree cap 458. In this manner, the pressure in the tubing annulus 42 may be monitored through the seal stab 492 and a corresponding external service and control line which is attached to the coupling 506, or the seal stab can be used to convey gas or other fluids from an external service and control line into the tubing annulus.

Figure 17:
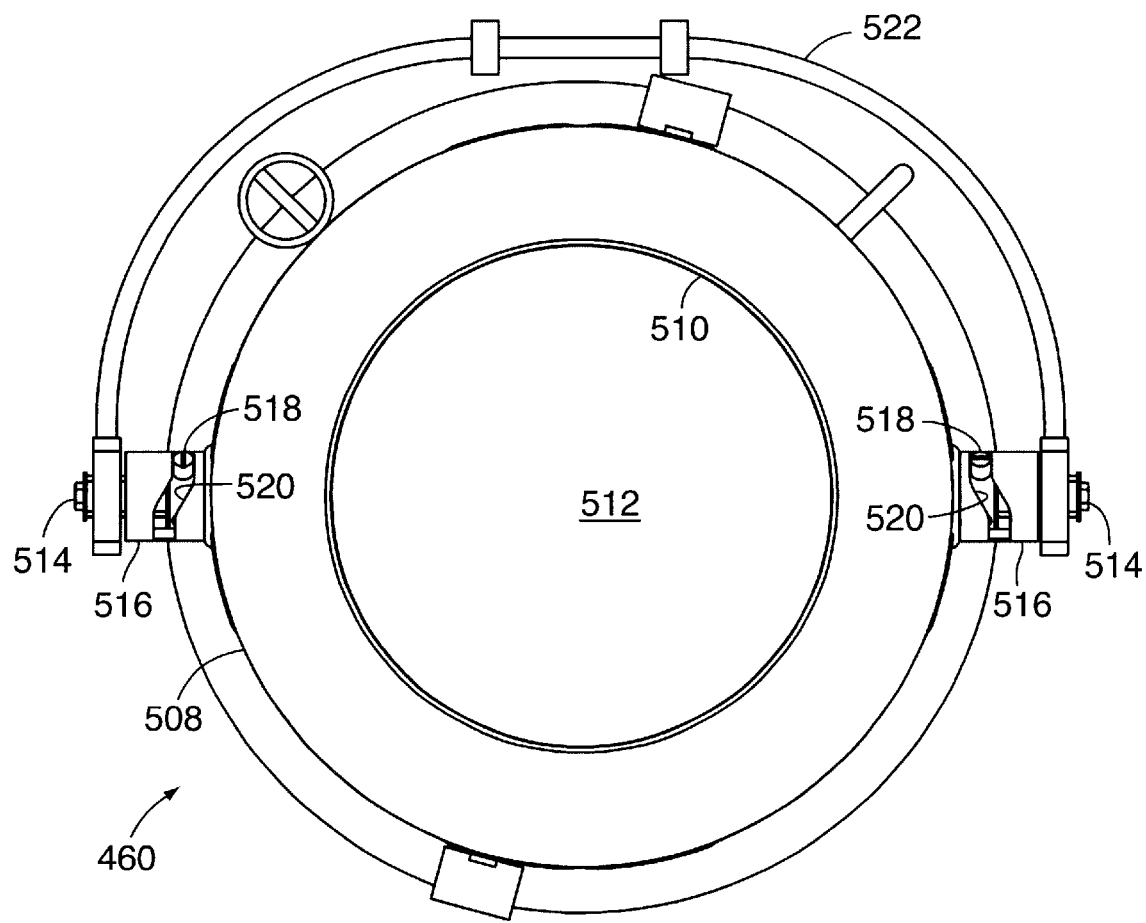
FIG. 17 is a top view of the locking cap component of the flow completion apparatus shown in FIG. 13.

Referring to FIGS. 13 and 17, the debris cap 460 is preferably a separate member which is mounted to the top of the tubing spool 12 after the tree cap 458 is installed. The debris cap 460 comprises an annular body having an outer rim 508 which is sized to fit around the outer diameter of the tubing spool 12 and an inner rim 510 which is adapted to fit closely around the upper end of the tree cap 458 and which defines an enlarged opening 512 through which the top of the tree cap 458 may be accessed. In addition, the debris cap 460 preferably includes suitable seals which are positioned between the outer rim 508 and the tubing spool 12 and between the inner rim 510 and the tree cap 458. The seals function to keep sea water out of and corrosion inhibitor in the portion of the central bore 26 around the tree cap 458.

The debris cap 460 is secured to the tubing spool 12 by preferably two locking pins 514, each of which is rotatably received in a cylindrical housing 516 that is attached to the outer rim 508. Each pin 514 includes a radially extending lug 518 which slidably engages a corresponding dogleg groove 520 that is formed in the housing 516. In addition, the debris cap 460 includes a handle 522 which is connected to both pins 514. When the handle 522 is in the raised position, the lugs 518 will occupy the radial outer portion of the dogleg groove 520 and the pins will be in a radially outward position. When the handle 522 is lowered, the lugs 518 will follow the dogleg groove 520 radially inwardly and thereby force the pins into engagement with an annular groove which is formed on the outer diameter of the tubing spool 12 to thereby lock the debris cap to the tubing spool.

Figure 18:
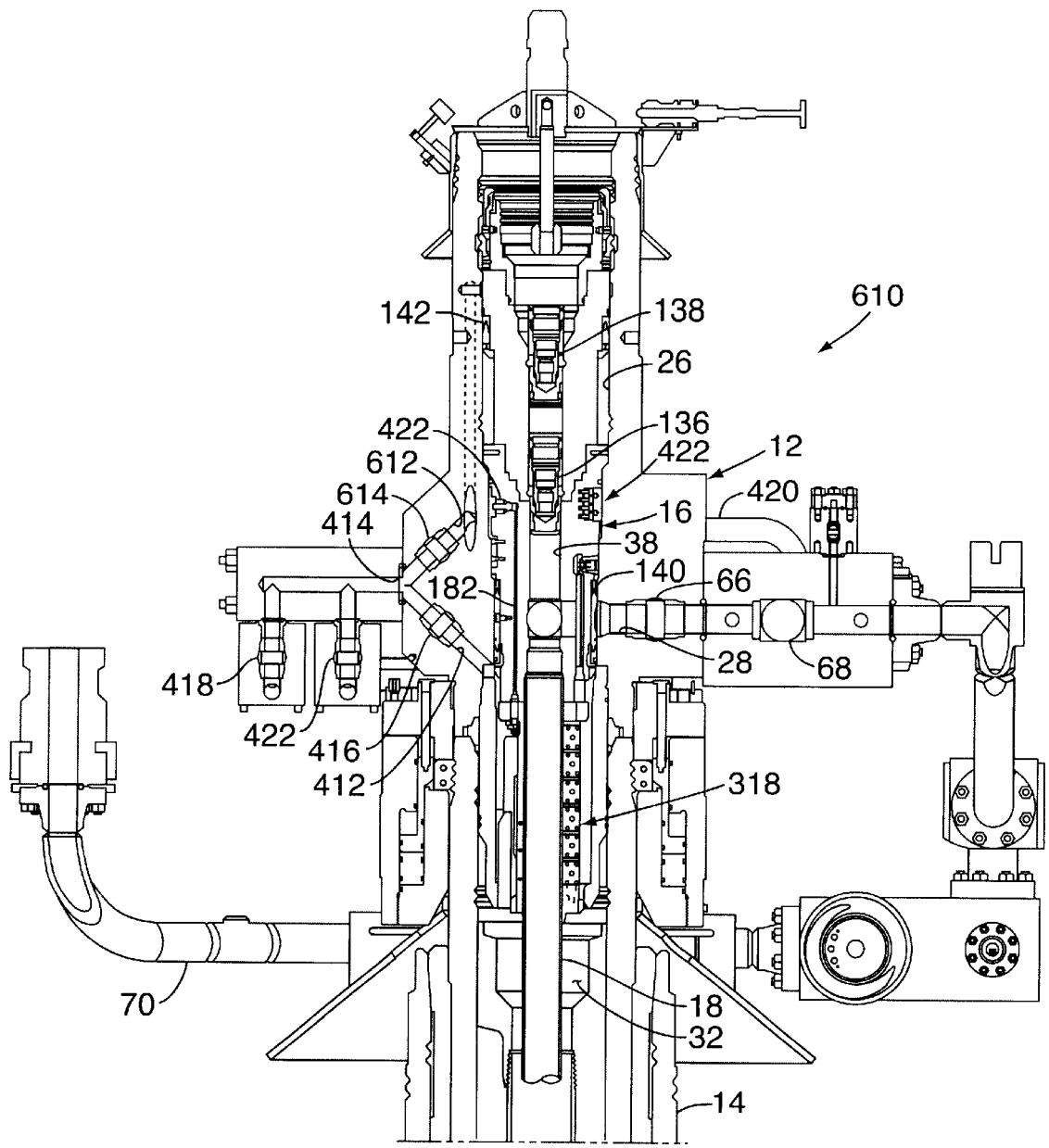
FIG. 18 is a longitudinal cross-sectional view of a further embodiment of the flow completion system of the present invention.

Another embodiment of a flow completion system according to the present invention is illustrated in FIG. 18. The flow completion assembly of this embodiment, which is indicated generally by reference number 610, is shown to be similar in many respects to the flow completion systems 10, 410 discussed above. However, the flow completion assembly 610 does not comprise an annulus bore 42 extending through the tubing hanger 16. Rather, the flow completion assembly 610 includes a workover passageway 612 which extends through the tubing spool 12 from the annulus passageway 412 to above where the second annular seal 142 seals to the central bore 26. In addition, the flow completion system 610 preferably includes a workover valve 614 for controlling flow through the workover passageway 612. In this manner, fluids may be communicated between the tubing annulus 32 and the portion of the central bore 26 which is located above the tubing hanger 16 through the annulus passageway 412 and the workover passageway 612.

Although the above-described embodiments of the flow completion system of the present invention preferably include two pressure-containing barriers which are associated with the tubing hanger, in circumstances where only a single pressure-containing barrier is required between the well bore and the environment, the present invention contemplates that only a single barrier may be associated with the tubing hanger. In such a flow completion system, a pressure-containing tree cap would not be required to provide a second barrier between the well bore and the environment. Rather, a simple debris cap or lightweight, ROV deployable tree cap such as disclosed herein may be employed to prevent sea water from entering the production bore above the tubing hanger and to possibly provide for fluid or electrical communication between the service and control conduits in the tubing hanger and corresponding external service and control lines. This embodiment of the flow completion system is advantageous because it does not require the use of a pressure-containing tree cap and therefore eliminates the above-mentioned problems which are associated with using such a tree cap.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A flow completion system for controlling the flow of fluid from a well bore, the flow completion system comprising:
   a tubing spool which includes a central bore that extends axially therethrough and a production outlet which communicates with the central bore;
   a tubing hanger which is supported in the central bore and which includes a production bore that extends axially therethrough and a production passageway that communicates between the production bare and the production outlet, the tubing hanger supporting a tubing string which extends into the well bore and defines a tubing annulus surrounding the tubing string;
   a first closure member which is positioned in the production bore above the production passageway;
   a first annular seal which is positioned between the tubing hanger and the central bore above the production passageway;
   wherein the first closure member and the first seal comprise a first pressure-containing barrier between the well bore and a surrounding environment;
   a second closure member which is positioned in the production bore above the first closure member; and
   a second annular seal which is positioned between the tubing hanger and the central bore above the first seal;
   wherein the second closure member and the second seal comprise a second pressure-containing barrier between the well bore and the environment;
   wherein both the first and the second barriers are associated with the tubing hanger;
   wherein the tubing spool comprises an annulus outlet and an annulus passageway which extends between the tubing annulus and the annulus outlet; and
   wherein the tubing spool comprises a workover passageway which extends between the annulus passageway and a portion of the central bore that is located above the second annular seal.

2. The flow completion system of claim 1, further comprising a crossover line which is fluidly connected between the production outlet and the annulus outlet, wherein fluid communication between the production bore and the tubing annulus may be established through the production passageway, the production outlet, the crossover line and the annulus passageway.

3. The flow completion system of claim 1, further comprising:
   a BOP which is removably connectable to the top of the tubing spool and which includes a BOP bore, a set of BOP rams, and at least one choke and kill line that communicates with a portion of the BOP bore which is located below the BOP rams; and
   a tubing hanger running tool which is removably connectable to the top of the tubing hanger and which includes a cylindrical outer surface portion, a production port that communicates with the production bore, and an annulus port that comprises a first end which communicates with the workover passageway and a second end which communicates with the outer surface portion;
   wherein the BOP rams are adapted to sealingly engage the outer surface portion above the second end of the annulus port; and
   wherein fluid communication between the tubing annulus and the BOP choke and kill line may be established through the annulus passageway, workover passageway, the annulus port and the portion of the BOP bore which is located below the first BOP rams.

4. A flow completion system for controlling the flow of fluid from a well bore, the flow completion system comprising:
   a tubing spool which includes a central bore that extends axially therethrough and a production outlet which communicates with the central bore;
   a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;
   a first closure member which is positioned in the production bore above the production passageway;
   a first annular seal which is positioned between the tubing hanger and the central bore above the production passageway;
   wherein the first closure member and the first seal comprise a first pressure-containing barrier between the well bore and a surrounding environment;
   a second closure member which is positioned in the production bore above the first closure member;
   a second annular seal which is positioned between the tubing hanger and the central bore above the first seal;
   wherein the second closure member and the second seal comprise a second pressure-containing barrier between the well bore and the environment;
   wherein both the first and the second barriers are associated with the tubing hanger;
   an annulus bore which extends generally axially through the tubing hanger between the tubing annulus and a portion of the central bore that is located above the second seal; and
   an annulus closure member which is positioned in the annulus bore;
   wherein the tubing spool comprises an annulus outlet and an annulus passageway which extends between the tubing annulus and the annulus outlet.

5. The flow completion system of claim 4, further comprising a crossover line which is fluidly connected between the production outlet and the annulus outlet, wherein fluid communication between the production bore and the tubing annulus may be established through the production passageway, the production outlet, the crossover line and the annulus passageway.

6. A flow completion system for controlling the flow of fluid from a well bore, the flow completion system comprising:

a tubing spool which includes a central bore that extends axially therethrough and a production outlet which communicates with the central bore;

a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;

a first closure member which is positioned in the production bore above the production passageway;

a first annular seal which is positioned between the tubing hanger and the central bore above the production passageway;

wherein the first closure member and the first seal comprise a first pressure-containing barrier between the well bore and a surrounding environment;

a second closure member which is positioned in the production bore above the first closure member;

a second annular seal which is positioned between the tubing hanger and the central bore above the first seal;

wherein the second closure member and the second seal comprise a second pressure-containing barrier between the well bore and the environment;

wherein both the first and the second barriers are associated with the tubing hanger;

wherein the second annular seal comprises a metal seal; and a seal ring which is positioned between the second annular seal and the tubing hanger.

7. The flow completion system of claim 6, wherein the seal ring comprises a C-shaped cross section.

8. A flow completion system for controlling the flow of fluid from a well bore, the flow completion system comprising:

a tubing spool which includes a central bore that extends axially therethrough and a production outlet which communicates with the central bore;

a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;

a first closure member which is positioned in the production bore above the production passageway;

a first annular seal which is positioned between the tubing hanger and the central bore above the production passageway;

wherein the first closure member and the first seal comprise a first pressure-containing barrier between the well bore and a surrounding environment;

a second closure member which is positioned in the production bore above the first closure member; and a second annular seal which is positioned between the tubing hanger and the central bore above the first seal;

wherein the second closure member and the second seal comprise a second pressure-containing barrier between the well bore and the environment;

wherein both the first and the second barriers are associated with the tubing hanger; and wherein the tubing hanger comprises at least two service and control conduits which each extend through the tubing hanger to the tubing annulus.

9. The flow completion system of claim 8, further comprising a first conduit closure member for controlling flow through each service and control conduit.

10. The flow completion system of claim 9, wherein the first conduit closure member comprises a multiport gate valve assembly which is fluidly connected to each of the service and control conduits.

11. The flow completion system of claim 9, wherein the first conduit closure member comprises a poppet-type fluid coupling.

12. The flow completion system of claim 11, wherein the poppet-type fluid coupling is adapted to be engaged by a corresponding coupling that is supported on the tubing spool.

13. The flow completion system of claim 9, further comprising at least one second conduit closure member for controlling flow through each service and control conduit.

14. The flow completion system of claim 13, wherein the second conduit closure member comprises a valve closure member which is normally biased into a closed position.

15. The flow completion system of claim 13, wherein the second conduit closure member comprises a valve closure member which is normally biased into an open position.

16. The flow completion system of claim 13, wherein the first and second conduit closure members are disposed in a single member.

17. The flow completion system of claim 16, wherein the first conduit closure member comprises a poppet valve.

18. The flow completion system of claim 17, wherein the second conduit closure member comprises a gate valve.

19. The flow completion system of claim 8, further comprising a controls bridge which is securable to at least one of the tubing hanger and the tubing spool and which includes a number of bridge lines, each of which is connectable between one of the service and control conduits and a corresponding external service and control line.

20. A flow completion system for controlling the flow of fluid from a well bore, the flow completion system comprising:

a tubing spool which includes a central bore that extends axially therethrough and a production outlet which communicates with the central bore;

a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;

a first closure member which is positioned in the production bore above the production passageway;

a first annular seal which is positioned between the tubing hanger and the central bore above the production passageway;

wherein the first closure member and the first seal comprise a first pressure-containing barrier between the well bore and a surrounding environment;

a second closure member which is positioned in the production bore above the first closure member;

a second annular seal which is positioned between the tubing hanger and the central bore above the first seal;

wherein the second closure member and the second seal comprise a second pressure-containing barrier between the well bore and the environment; and wherein both the first and the second barriers are associated with the tubing hanger;

an annulus bore which extends generally axially through the tubing hanger between the tubing annulus and a portion of the central bore that is located above the second seal;

a first annulus closure member which is positioned in the annulus bore; and a second annulus closure member which is positioned in the annulus bore.

21. The flow completion system of claim 20, wherein the second annulus closure member comprises a valve closure member which is normally biased into a closed position.

22. The flow completion system of claim 21, wherein the second annulus closure member comprises a sting-open check valve.

23. A flow completion system for controlling the flow of fluid from a well bore, the flow completion system comprising:

a tubing spool which includes a central bore that extends axially therethrough and a production outlet which communicates with the central bore;

a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;

a first closure member which is positioned in the production bore above the production passageway;

a first annular seal which is positioned between the tubing hanger and the central bore above the production passageway;

wherein the first closure member and the first seal comprise a first pressure-containing barrier between the well bore and a surrounding environment;

a second closure member which is positioned in the production bore above the first closure member;

a second annular seal which is positioned between the tubing hanger and the central bore above the first seal;

wherein the second closure member and the second seal comprise a second pressure-containing barrier between the well bore and the environment;

wherein both the first and the second barriers are associated with the tubing hanger;

a tubing hanger running tool which is removably connectable to the top of the tubing hanger and which includes a production port that communicates with the production bore and an annulus port that communicates with the tubing annulus;

wherein the tubing spool comprises an annulus passageway that communicates with the tubing annulus and a workover passageway that extends between the annulus passageway and the central bore;

wherein the annulus port communicates with the tubing annulus through the workover passageway and the annulus passageway;

a BOP which is removably connectable to the top of the tubing spool and which includes a BOP bore and at least one choke and kill line that communicates with the BOP bore;

wherein the annulus port communicates with the BOP bore;

whereby fluid communication between the tubing annulus and the BOP choke and kill line may be established through the BOP bore, the annulus port, the workover passageway and the annulus passageway.

24. A flow completion system for controlling the flow of fluid from a well bore, the flow completion system comprising:

a tubing spool which includes a central bore that extends axially therethrough and a production outlet which communicates with the central bore;

a tubing hanger which is supported in the central bore and which includes a production bore that extends axially therethrough and a production passageway that communicates between the production bore and the production outlet, the tubing hanger supporting a tubing string which extends into the well bore and defines a tubing annulus surrounding the tubing string;

a first closure member which is positioned in the production bore above the production passageway;

a first annular seal which is positioned between the tubing hanger and the central bore above the production passageway;

wherein the first closure member and the first seal comprise a first pressure-containing barrier between the well bore and a surrounding environment;

a second closure member which is positioned in the production bore above the first closure member;

a second annular seal which is positioned between the tubing hanger and the central bore above the first seal;

wherein the second closure member and the second seal comprise a second pressure-containing barrier between the well bore and the environment;

wherein both the first and the second barriers are associated with the tubing hanger;

a tubing hanger running tool which Is removably connectable to the top of the tubing hanger and which includes a production port that communicates with the production bore and an annulus port that communicates with the tubing annulus;

wherein the tubing hanger comprises an annulus bore that communicates with the tubing annulus;

wherein the annulus port communicates with the tubing annulus through the annulus bore;

a BOP which is removably connectable to the top of the tubing spoof and which includes a BOP bore and at least one choke and kill line that communicates with the BOP bore;

wherein the annulus port communicates with the BOP bore;

whereby fluid communication between the tubing annulus and the BOP choke and kill line may be established through the BOP bore, the annulus port and the annulus bore.

* * * * *

US006655455C1

(12) EX PARTE REEXAMINATION CERTIFICATE (6844th)

United States Patent
Bartlett et al.

(10) Number: US 6,655,455 C1
(45) Certificate Issued: May 26, 2009

(54) FLOW COMPLETION SYSTEM

(75) Inventors: Christopher D. Bartlett, Spring, TX (US); Christopher E. Cunningham, Spring, TX (US); Richard D. Kent, Newburgh (GB); Nicholas Gatherar, Juniper Green (GB); David Harrold, Houston, TX (US)

(73) Assignee: FMC Technologies, Inc., Chicago, IL (US)

Reexamination Request:
No. 90/008,768, Jul. 6, 2007
No. 90/009,060, May 6, 2008

Reexamination Certificate for:
Patent No.: 6,655,455
Issued: Dec. 2, 2003
Appl. No.: 10/213,749
Filed: Aug. 5, 2002

Related U.S. Application Data

(63) Continuation of application No. 09/815,437, filed on Mar. 22, 2001, now Pat. No. 6,494,257.
(60) Provisional application No. 60/192,124, filed on Mar. 24, 2000, and provisional application No. 60/268,329, filed on Feb. 12, 2001.

(51) Int. Cl.
*E21B 33/04* (2006.01)

(52) U.S. Cl. ............... 166/86.2; 166/368; 166/348; 166/95.1
(58) Field of Classification Search .................. None
See application file for complete search history.

(56) References Cited

FOREIGN PATENT DOCUMENTS

EP       0719905 B1 *  3/1996
GB       2321658    *  8/1988

OTHER PUBLICATIONS

Functional Specification—Supply of Subsea Completion Systems & Istallation Equipment Horizontal Xmax Trees, ABB Vetco Gray (Apr. 1996).*
D. Lorimer, Horizontal Horizontal Subsea Trees for the Shasta Development: An Operators Perspective, Offshore Technology Conference, OTC 8252 (May 1996).*
J. Vick et al., A Static Slickline–Retrievable Wellhead Plug System for Use with Horizontal Trees in Offshore Systems, Society of Petroleum Engineers, Inc., SPE 50591, (1998).*
5,000 psi Horizontal Tree Surface System Operation Features, ABB Vetco Gray.*
N.P. Omsberg, Surface Lateral Tree for North Sea Platform, Society of Petroleum Engineers, Inc., SPE 26773 (1993).*
HT—At last, wellhead seal integrity in horizontal trees, ABB Vetco Gray Inc. (Aug. 1995).*
J. Tait, The Horizontal Xmas Tree, The Story So Far, Horizontal Xmas Tree Information Package (1993).*
Scott and Bowring, "Electrical Submersible Pumps in Subsea Completions," SPE 23050, 1991.

(Continued)

*Primary Examiner*—Cary E. O'Connor

(57) ABSTRACT

A flow completion system for controlling the flow of fluid from a well bore, the flow completion system comprising a tubing spool, a tubing hanger supporting a tubing string which extends into the well bore and defines a tubing annulus surrounding the tubing string; a first closure member which is positioned in the production bore above the production passageway; a first annular seal wherein the first closure member and the first seal comprise a first pressure-containing barrier between the well bore and a surrounding environment; a second closure member which is positioned in the production bore above the first closure member; and a second annular seal wherein the second closure member and the second seal comprise a second pressure-containing barrier between the well bore and the environment; and wherein both the first and the second barriers are associated with the tubing hanger.

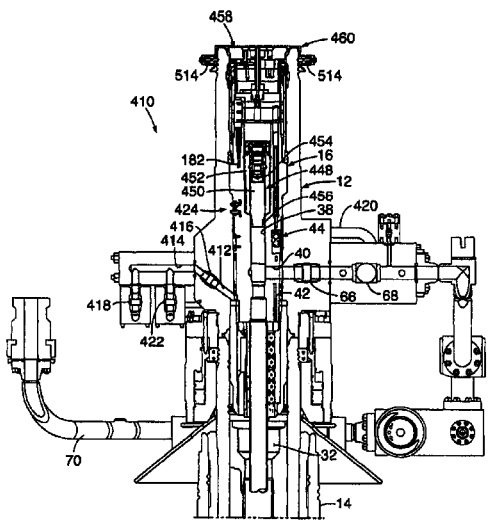

OTHER PUBLICATIONS

Participation Agreement Relating to the Development of Subsea Submersible Pumping, 1990–1991.

Subsea Submersible Pumping Project Task Series 1000 Equipment Evaluations, unknown date.

Subsea Submersible Pumping (S.S.P.) Second Interim Report—Technical, Jun. 1991.

Subsea Submersible Pumping Project Final Report, vol. 1, Mar. 1992.

Subsea Submersible Pumping Project Final Report, vol. 2, Mar. 1992.

Subsea Submersible Pumping Project Final Report, vol. 3, Mar. 1992.

ABB Vetco Gray Memorandum dated Jul. 8, 1993 re S.U.T.—"Horizontal Tree Debate"—Pre SPUD Meeting with paper entitled "The Great Horizontal Subsea Tree Discussion" attached.

Cohen et al., "Development of a Gas Handling Hydraulic Submersible Pump and Planning a Field Trial, Captain Field," OTC 8511, 1997.

ABB Vetco Brohcure, "Horizontal Tree Demonstration Report," 1995.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 6 and 23 are cancelled.

Claims 3–5, 7–22 and 24 were not reexamined.

\* \* \* \* \*